United States Patent
Boldyrev et al.

(10) Patent No.: US 9,141,618 B2
(45) Date of Patent: Sep. 22, 2015

(54) METHOD AND APPARATUS FOR PROCESSING METADATA IN ONE OR MORE MEDIA STREAMS

(75) Inventors: Sergey Boldyrev, Söderkulla (FI); Ian Justin Oliver, Söderkulla (FI); Jari-Jukka Harald Kaaja, Järvenpää (FI); Jarmo Tapani Arponen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/605,452

(22) Filed: Sep. 6, 2012

(65) Prior Publication Data

US 2013/0066891 A1    Mar. 14, 2013

Related U.S. Application Data

(60) Provisional application No. 61/532,736, filed on Sep. 9, 2011.

(51) Int. Cl.
| | | |
|---|---|---|
| G06F 17/30 | (2006.01) | |
| H04N 21/235 | (2011.01) | |
| H04N 21/414 | (2011.01) | |
| H04N 21/443 | (2011.01) | |
| H04N 21/81 | (2011.01) | |
| H04N 21/8543 | (2011.01) | |
| H04N 21/858 | (2011.01) | |

(52) U.S. Cl.
CPC ...... *G06F 17/30038* (2013.01); *H04N 21/2353* (2013.01); *H04N 21/41407* (2013.01); *H04N 21/4431* (2013.01); *H04N 21/816* (2013.01); *H04N 21/858* (2013.01); *H04N 21/8543* (2013.01)

(58) Field of Classification Search
None
See application file for complete search history.

(56) References Cited

U.S. PATENT DOCUMENTS

| | | | |
|---|---|---|---|
| 6,877,134 B1* | 4/2005 | Fuller et al. | 715/202 |
| 2002/0083469 A1 | 6/2002 | Jeannin et al. | |
| 2007/0180488 A1* | 8/2007 | Walter et al. | 725/135 |
| 2008/0028074 A1* | 1/2008 | Ludvig | 709/226 |
| 2008/0172293 A1* | 7/2008 | Raskin et al. | 705/14 |

(Continued)

FOREIGN PATENT DOCUMENTS

WO    2009/041869 A1    4/2009

OTHER PUBLICATIONS

Automatic Conversion of MPEG-7 Specification and Data into RDF(S) for Semantic Interoperability in Information Retrieval by J.M. Yoo, IEEE 2005.*

(Continued)

*Primary Examiner* — Robert Beausoliel, Jr.
*Assistant Examiner* — Hau H Hoang
(74) *Attorney, Agent, or Firm* — Ditthavong & Steiner, P.C.

(57) ABSTRACT

An approach is provided for processing metadata in one or more media streams. A media metadata processing platform determines to parse from a media data stream for metadata components. The media metadata processing platform also causes, at least in part, a storing of the parsed metadata components. The media metadata processing platform further determines to mark the media data stream with one or more hooks for embedding the parsed metadata components, one or more computational closures, or a combination thereof, the one or more computational closures being serialized.

20 Claims, 13 Drawing Sheets

(56) References Cited

U.S. PATENT DOCUMENTS

2010/0131590 A1* 5/2010 Coleman et al. .............. 709/203
2011/0099195 A1* 4/2011 Patwardhan et al. ......... 707/769

OTHER PUBLICATIONS

Introducing Time into RDF by Claudio Gutierrez, IEEE, Dec. 19, 2006.*

Metadata-Driven Multimedia Access written by Peter Van Beek, John R. Smith, Touradj Ebrahimi, Teruhiko Suzuki, and Joel Askelof (hereafter Beek), IEEE signal processing magazine, 2003, pp. 40-52.*

Notification of Transmittal of the International Search Report and the Written Opinion of the International Searching Authority, or the Declaration for Application No. PCT/FI2012/050836, dated Mar. 14, 2013, pp. 1-14.

M. Lopez-Nores et al., "MiSPOT: dynamic product placement for digital TV through MPEG-4 processing and semantic reasoning," Journal, Published in Knowledge Information Systems, Jan. 2010, vol. 22, pp. 101-128; retrieved from http://nortia.det.uvigo.es/grupo/administrator/components/com_jresearch/files/publications/KAIS-Martin-10.pdf.

R. Garcia et al., "Semantic Integration and Retrieval of Multimedia Metadata," Conference Paper, 2nd European Workshop on the Integration of Knowledge, Semantic and Digital Media, 2005, pp. 69-80; retrieved from http://ceur-ws.org/Vol-185/semAnnot05-07.pdf.

* cited by examiner

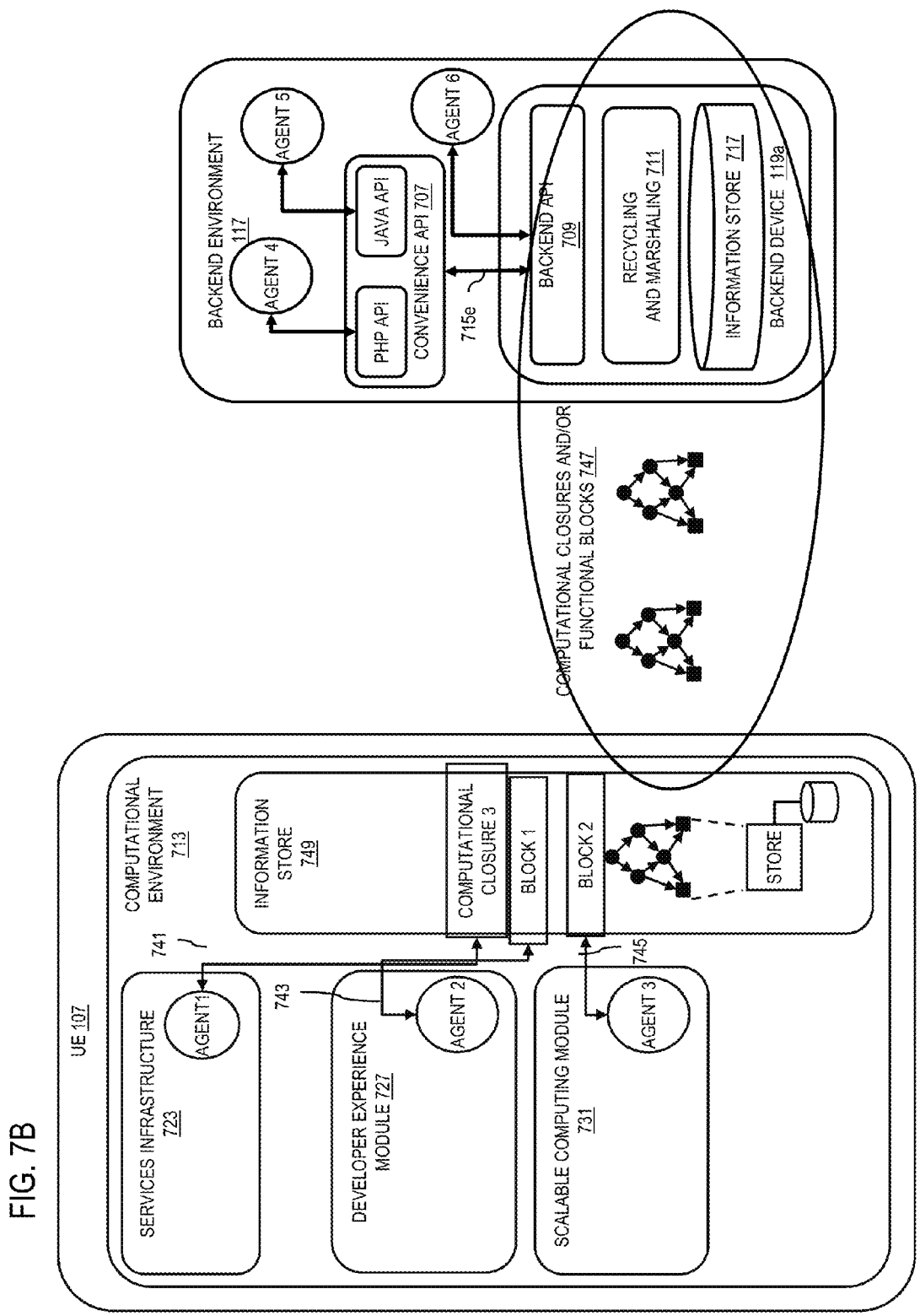

METHOD AND APPARATUS FOR PROCESSING METADATA IN ONE OR MORE MEDIA STREAMS

RELATED APPLICATIONS

This application claims benefit of the earlier filing date under 35 U.S.C. §119(e) of U.S. Provisional Application Ser. No. 61/532,736 filed Sep. 9, 2011, entitled "Method and Apparatus for Processing Metadata in One or More Media Streams," the entirety of which is incorporated herein by reference.

BACKGROUND

Mobile devices are becoming the primary gateway to the internet for many people. Combining functionalities and data of mobile devices with personal computers, sensor devices, internet service platforms, etc. is a major challenge of interoperability. This can be achieved through numerous, individual and personal information spaces in which entities (e.g., service providers, network operators, publishers, application developers, end users, etc.) can place, share, interact and manipulate (or program devices to automatically perform the planning, interaction and manipulation of) webs of information with their own locally agreed semantics without necessarily conforming to an unobtainable, global whole. In addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device.

It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still there are challenges in certain example implementations to achieve scalable high context information processing within such heterogeneous environments. In various implementations, existing media stream containers, such as MPEG 7, have built-in mechanisms for audio, video and metadata processing and harvesting, yet with limited or no mechanisms for transforming, embedding, extracting, and reasoning media metadata. By way of example, MPEG 7 merely supports keyword searches in metadata written in an Extensible Markup Language (XML) and embedded in media streams for content of interest. A client application or the cloud is required to processes the media stream in a XML protocol through a data manipulation layer, a data analysis layer, a data distribution layer, a storage, etc. The expression for querying in terms of the XML tree is complicated because there are generally a large number of ways to correspond the XML maps onto a logical tree, and the query has to be independent of the choice of the XML map.

SOME EXAMPLE EMBODIMENTS

Therefore, there is a need for an approach for efficiently processing metadata in one or more media streams.

According to one embodiment, a method comprises determining to parse from a media data stream for metadata components. The method also comprises causing, at least in part, a storing of the parsed metadata components. The method further comprises determining to mark the media data stream with one or more hooks for embedding the parsed metadata components, one or more computational closures, or a combination thereof, the one or more computational closures being serialized.

According to another embodiment, an apparatus comprises at least one processor, and at least one memory including computer program code for one or more programs, the at least one memory and the computer program code configured to, with the at least one processor, cause, at least in part, the apparatus to determine to parse from a media data stream for metadata components. The apparatus is also causes, at least in part, a storing of the parsed metadata components. The apparatus is further caused to determine to mark the media data stream with one or more hooks for embedding the parsed metadata components, one or more computational closures, or a combination thereof, the one or more computational closures being serialized.

According to another embodiment, a computer-readable storage medium carries one or more sequences of one or more instructions which, when executed by one or more processors, cause, at least in part, an apparatus to determine to parse from a media data stream for metadata components. The apparatus is also causes, at least in part, a storing of the parsed metadata components. The apparatus is further caused to determine to mark the media data stream with one or more hooks for embedding the parsed metadata components, one or more computational closures, or a combination thereof, the one or more computational closures being serialized.

According to another embodiment, an apparatus comprises means for determining to parse from a media data stream for metadata components. The apparatus also comprises means for causing, at least in part, a storing of the parsed metadata components. The apparatus further comprises means for determining to mark the media data stream with one or more hooks for embedding the parsed metadata components, one or more computational closures, or a combination thereof, the one or more computational closures being serialized.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the claimed methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7B are diagrams of computation distribution among devices, according to one embodiment;

DESCRIPTION OF SOME EMBODIMENTS

Examples of a method, apparatus, and computer program for processing metadata in one or more media streams are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computational closure" identifies a particular computation procedure together with relations and communications among various processes including passing arguments, sharing process results, selecting results provided from computation of alternative inputs, flow of data and process results, etc. The computational closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computational closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Although various embodiments are described with respect to MPEG 7, it is contemplated that the approach described herein may be used with H.264, HTML5, VP8, WebM, WebP, and/or any other available media codec.

Figure 1:
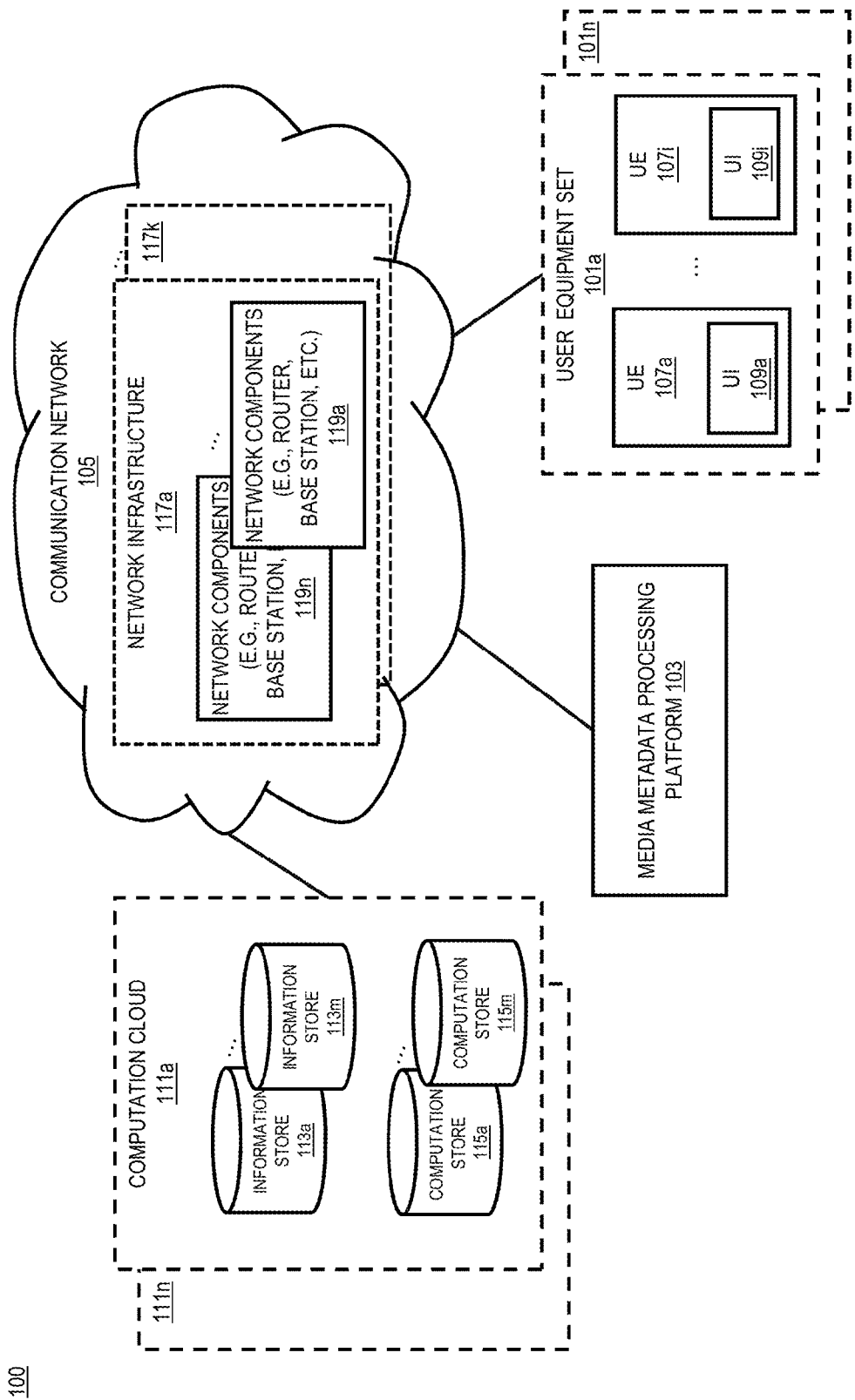
FIG. 1 is a diagram of a system capable of processing metadata in one or more media streams, according to one embodiment.

FIG. 1 is a diagram of a system capable of processing metadata in one or more media streams, according to one embodiment. As previously described, a cloud environment consists of information and computation resources each consisting of several distributed devices that communicate information and computational closures via a shared memory. A device within a cloud environment may store computational closures locally in its own memory space or publish computational closures on a globally accessible environment within the cloud. In the first case, the device is responsible for any process needed for combination or extraction of computations, while in the second case the processes can be conducted by the globally accessible environment which includes the device. The device can utilize the resources of, for example, the cloud and/or components of the infrastructure for fast processing. In one embodiment, if the infrastructure provides the computational closures for processing, then the various embodiments of the process described herein can be performed entirely in an infrastructure environment.

The basic concept of cloud computing technology provides access to distributed computations for various resources (that may reside in one or more devices, routers, servers, apparatus, etc.) within the scope of the cloud, in such a way that the distributed nature of the computations is hidden from users/entities and it appears to a user as if all the computations are performed on the same resource. The cloud computing also enables a user to have control over computation distribution by transferring computations between resources that the user has access to. For example, a user may want to transfer computations among work devices, home devices, and portable devices, other private and public devices, etc. Current technologies enable a user to manipulate contexts such as data and information via the elements of a user interface of their user equipment.

More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computational closures. Once the computation of a computational flow is divided into its primitive computational closures, the processes within or represented by each closure may be executed in a distributed fashion and the processing results can be collected and aggregated into the result of the execution of the initial overall computation. Typically, the computational closures associated with a computational flow are defined, constructed, and executed within the device computing level, the infrastructure level, the cloud level, or a combination thereof. Therefore, execution of computational closures associated with a process related to a device at the infrastructure level can provide services to device users in an efficient manner.

However, existing media stream containers, such as MPEG 7, requires a client application or the cloud to process the media stream in a XML protocol through a data manipulation layer, a data analysis layer, a data distribution layer, a storage, etc. for transforming, embedding, extracting, and reasoning media metadata. A mapping from XML documents to semantic graphs is multiple to one, so the client application or the cloud requires a schema for the mapping. The expression for querying in terms of the XML tree is complicated because there are generally a large number of ways in which the XML maps onto the logical tree, and the query has to be independent of the choice of the XML map. There is a need for an efficient and simple approach for processing metadata in one or more media streams.

To address these problems, a system 100 of FIG. 1 introduces the capability of applying a serialized semantic data structure on media metadata, one or more computational closures, etc. associated with one or more media streams.

By way of example, the system 100 uses an ontology (e.g., OWL) to describe media metadata in a serialized data structure (e.g., the Resource Descriptor Format (RDF) data model). The serialization basically converts the set of all possible representations of one fact in XML protocols into one statement, thus serves as an efficient mechanism of transforming, embedding, extracting, and reasoning media metadata. RDF notion consists of {Subject, Predicative, Object, capabilities, System of Record (SOR), time stamp}. SOR shows where in a master data source that data was received and retrieved from. In one embodiment, the master data source may be a content provider, an internet service provider, an advertiser, a publisher, etc. In another embodiment, the master data source may be a user terminal, a social network website, etc. The system 100 marks media stream metadata fields for embedding serialized information, such as relevant, extra, classified and enabled for a query (e.g. the Golden Gate Bridge). The system 100 generates rules, SOR, etc. to facilitate media stream processing. The rules are used in a data manipulation layer (DML) to steer the media data to an RDF store, a storage of the cloud, etc.

After generating or receiving a media stream embedded with serialized metadata, the system 100 separates the media stream into a binary stream and metadata fields, and stores the data into separate storages based upon the rules. Thereafter, the system 100 performs high level reasoning (e.g., via software), low level reasoning (e.g., via hardware codec), or a combination thereof, over the metadata fields for the serialized and embedded information, in order to make decisions of such as tracking and removing adds, adding certain extra information (e.g., Nokia advertisement) into the media stream, etc. By way of example, the rule is if X={Nokia advertisement} then keep, else others remove, and the rule can be implemented based upon metadata in the RDF format more efficiently in term of resources and time consumption than based upon metadata in XML. In addition, the system 100 can track the source of the media stream through the serialized metadata. This enables enforcing digital right management, privacy, data security, etc. by tracking the metadata stored in an RDF store, the cloud, or a combination thereof.

In another embodiment, the system 100 enables additional information to be extracted, transformed and loaded through the metadata fields. Such additional information can vary from media master source information pointers to complex operations, such as tracking and adding extra files and burst information, etc.

With ability to reason and track, the system 100 combines or synchronizes media streams with a cloud provider over different types of wired or wireless connectivity systems, e.g. WLAN, WAN, Ethernet, RF memory tag systems, such as a RF memory tags that supports high speed data transfer from passive and/or active memory tags (e.g., RFID tags) in few seconds via direct radio links. By way of example, passive RF memory tags rely on mobile readers/writers that provide wireless power transfer to the tag (e.g., via near field communication (NFC) or ultra-high frequency (UHF)), as well as continuous wave (CW) and clock information; whereas active RF memory tags include a power source and only CW and clock are provided. Through these capabilities, the system 100 enables contextual mash-up of media streams, making sense out of disjoined streams, and improving user experience by means of contextual media streams analytics, and seamlessly integrating media streams contextually.

The system 100 facilities interactions between the user terminal, network nodes, and the cloud via RDF stores where media streams are separated and store to binary and metadata storages. The user terminal, RDF stores, and cloud can be connected via wired, wireless, WLAN, WAN, RF memory tag system, etc. to support metadata harvesting for analysis.

The system 100 further serializes computational closures (including units of computations and their connections, etc.)

using the serialized data structure to further facilitate media stream processing, such as reasoning, tracking, etc. A large set of basic functionalities can be created and added to the system 100 as elementary executable blocks (e.g., a functional block). When a new block is constructed and added to the system 100 it can be used and reused in programs as a building block. The computational closures provide scalability and flexibility of processing media streams. In one embodiment, the system 100 determines ontology associated with a computational flow of interest and functional blocks, constructs the computational flow from one or more of the functional blocks with connectors, functions, interfaces, etc. in-between. The ontology determines semantic descriptions of the connectors, the functions, and the interfaces.

The system 100 distributes the functional blocks among one or more entities of a computational environment based on the ontology, and causes resources to execute the functional blocks based on the distribution. The distribution and the execution are based on the serialized semantic descriptions. In another embodiment, at least one of the distribution and the execution are processed in parallel to further improve computational efficiency. The system 100 further serializes and recomposes computations made up of several connected blocks in order to distribute the calculations in an entity, an information store, an information space, a cloud, or a combination thereof.

The system 100 also serializes other media stream reasoning and processing mechanisms for, e.g., energy saving, load balancing, privacy, data security, etc., using the serialized data structure. The system 100 handles computations, reasoning and processing mechanisms in order to maximize parallelism, minimize delay and cost, or a combination thereof.

As shown in FIG. 1, the system 100 comprises a set 101 of user equipments (UEs) 107a-107i having connectivity to a media metadata processing platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and close proximity networks (e.g., NFC), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, functional blocks, or a combination thereof, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure.

In one embodiment, computational flow distribution can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, computational flow distribution may be triggered via gesture recognition, wherein the user preselects a particular set of UI elements and makes a gesture to simulate "pouring" the selected UE elements from one device to another. In other embodiments, computational flow distribution may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m, and computation stores 115a-115m. Each of the one or more computation spaces 115a-115m includes multiple sets of one or more computational closures, one or more functional blocks, or a combination thereof. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the communication network 105 consists of one or more infrastructures 117a-117k, each of which is a designed communication system including multiple components 119a-119n. The components 119a-119n include backbones, routers, switches, wireless access points, access methods, protocols, etc. used for communication within the communication network 105 or between communication network 105 and other networks. Each infrastructure 117 can interact with UE 107a-107i at an Infrastructure-as-a-Service (IaaS), a Platform-as-a-Service (PaaS) layer, or a Software-as-a-Service (SaaS) layer as defined by the National Institute of Standards and Technology (NIST).

IaaS includes all the system services that make up the foundation layer of a cloud—the server, computing, operating system, storage, data back-up and networking services. Operating at this layer, the infrastructure 117 manages the networking, hard drives, hardware of the server, virtualization O/S (if the server is virtualized), while the UE 107 remotely manage everything else (e.g., applications, data, middleware, runtime, O/S). PaaS includes the development tools to build, modify and deploy cloud optimized applications. Operating at this layer, the infrastructure 117 provides hosted application/framework/tools for UE 107 to build something on. SaaS includes the business applications. Operating at this layer, the infrastructure 117 provides business functionality to UE 107, such that UE 107 does not have to manage any service and all is done by the infrastructure 117.

In one embodiment, the media metadata processing platform 103 controls the distribution of computations expressed in the serialized data structure associated with UEs 107a-107i to other components or levels of the computational environment including the infrastructure level 117a-117k within the environment of the communication network 105, and the cloud level 111a-111n, based on resource availability associated with different architectural levels and resource consumption requirements of computations.

In one embodiment, computational flow execution (e.g., merging available 2D media data into a 3D image) may be initiated by the user, or based on a background activity for example by triggering a sequence of computational closures, functional blocks, or a combination thereof, which in turn support user activities.

In one embodiment, the computational closures, functional blocks, or a combination thereof, available in multiple levels of device level 101a-101n, infrastructure level 117a-117k, and cloud level 111a-111n are aligned, meaning that all the computational closures, functional blocks, or a combination thereof, are available in every level.

In another embodiment, a super-set of all computational closures, functional blocks, or a combination thereof, is available in the serialized data structure at cloud level while each lower level has access to a sub-set of the computational closures, functional blocks, or a combination thereof, from its higher (e.g., infrastructure or cloud) level. Additionally, levels of the computational environment may have sets of functionally equivalent computational closures or functional blocks in the sense that they render the same content with different levels of accuracy based upon different levels of resource consumption. For example, a high resolution video providing a set of computational closures, functional blocks, or a combination thereof, may be equivalent to a set of computational closures, functional blocks, or a combination thereof, that produce the same video with a lower levels of resolution based upon lower resource consumption. When configuring a UE 107a-107i, the user may select an option for receiving low resolution due to resource restrictions, e.g., low battery. In some embodiments, lower resolutions pictures may be selected based, at least in part, on privacy rules. For example, privacy rules may prevent certain pictures from being transmitted in full resolution, and will only permit low resolution images in which, for instance, faces are obscured to be transmitted.

By way of example, the UEs 107a-107i, and the media metadata processing platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
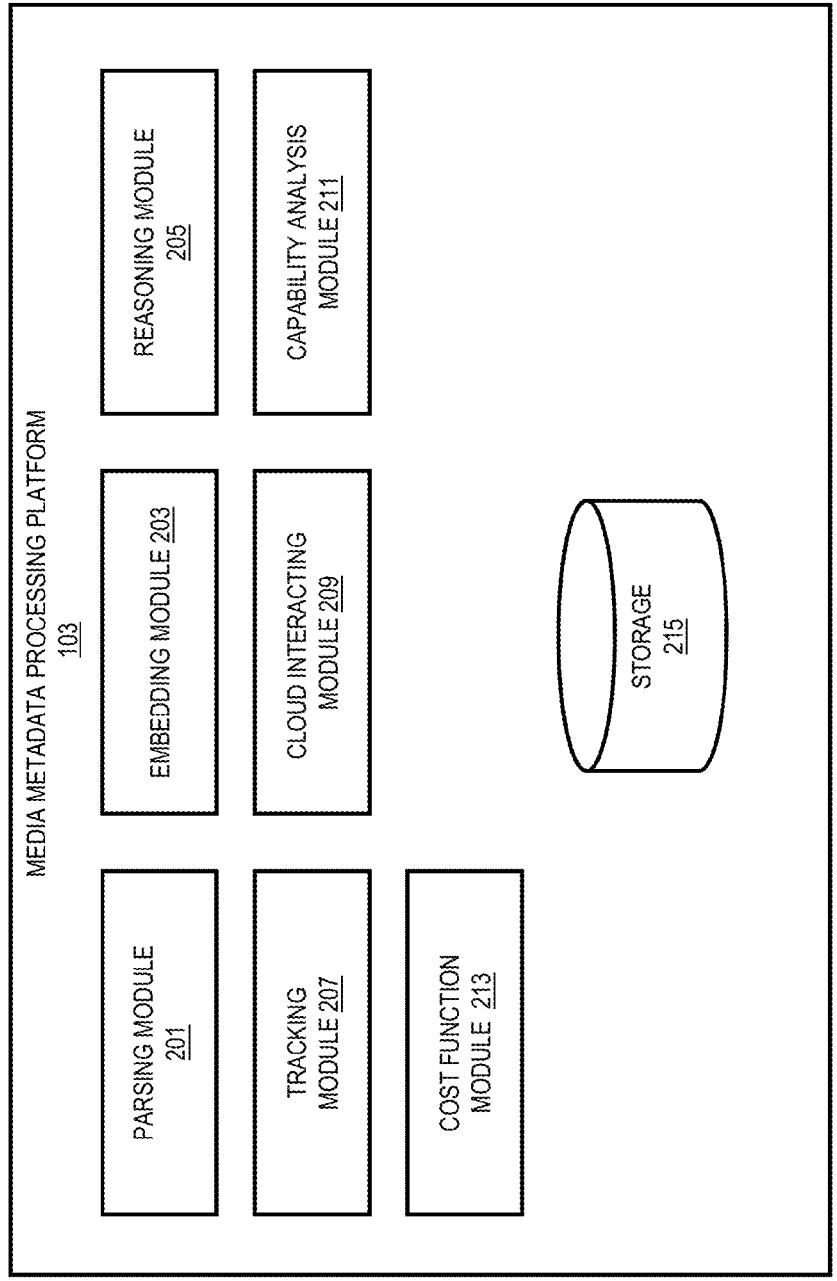
FIG. 2 is a diagram of the components of a media metadata processing platform, according to one embodiment.

FIG. 2 is a diagram of the components of a media metadata processing platform, according to one embodiment. By way of example, the media metadata processing platform 103 includes one or more components for processing metadata in one or more media streams. It is contemplated that the functions of these components may be combined in one or more components or performed by other components of equivalent functionality. In this embodiment, the media metadata processing platform 103 includes a parsing module 201, an embedding module 203, a reasoning module 205, a tracking module 207, a cloud interacting module 209, a capability analysis module 211, a cost function module 213, and a storage 215.

When receiving an A/V media stream, the parsing module 201 uses a resource description data model to parse information (e.g., metadata, media content data, etc.) from serialized media data (e.g., A/V streams in a binary format or a human-readable format, such as XML). In the context of data storage and transmission, serialization is the process of converting a data structure or object state into a format that can be stored (for example, in a file or memory buffer, or transmitted across a network connection link) and resurrected later in the same or a different computer environment. When the resulting series of bits is reread according to the serialization format, it can be used to create a semantically identical clone of the original object. A human-readable format of serialized media data may be JavaScript Object Notation (JSON), XML, etc. A binary format of serialized media data may be ASN.1, Binary JSON (BSON), etc.

The resource description data model may be RDF which defines a resource as any object that is uniquely identifiable by a Uniform Resource Identifier (URI). RDF is a general data model to decompose any type of knowledge into small pieces, with some rules about the semantics, or meaning, of those pieces. The properties associated with resources are identified by property-types, and property-types have corresponding values. Property-types express the relationships of values associated with resources. In RDF, values may be atomic in nature (text strings, numbers, etc.) or other resources, which in turn may have their own properties. A collection of these properties that refers to the same resource is called a description. RDF is a syntax-independent data model for representing resources and their corresponding descriptions.

The cloud affords unprecedented access to distributed information. Metadata improves access to this information, and RDF is a proposed for defining the architecture necessary for imposing structural constraints to provide unambiguous methods of expressing semantics for the consistent encoding, exchange, and machine processing of metadata. RDF additionally, provides means for publishing both a human-readable and a machine-processible vocabularies designed to encourage the exchange, use and extension of metadata semantics among disparate information communities.

By way of example, the content of an image of "the Golden Gate Bridge in a sunny day" can be extracted as an RDF triple. The subject denotes the resource (e.g., "Golden Gate Bridge"), the object denotes an attribute associated with the subject (e.g., "sunny day") and the predicate denotes traits or aspects of the resource and expresses a relationship between the subject and the object (e.g., "in"). There are two complementary expressions of an RDF triple: an RDF statement <Golden Gate Bridge, in, a sunny day">, or a RDF graph. An RDF graph of the RDF statement consists of two nodes "Golden Gate Bridge" and "a sunny day" interconnected by an edge "in." RDF expressions can be easily meshed together or broken down, as well as distributed via the cloud. RDF makes it easier to model knowledge (e.g., A/V metadata) and to mesh distributed knowledge sources (e.g., information stores and the cloud).

Each content provider may publish a file in RDF on their own websites. The content providers can choose URIs for their products, and the users will use those URIs when composing their reviews. The content providers do not need to agree on a common naming scheme for products, and users aren't tied to a content provider-controlled data format. RDF allows the content providers and users to agree on what they need to agree on, without forcing anyone to use one particular vocabulary, as follows in Table 1:

The parsing module 201 does not need to know the nature of the data in these files to be able to extract into RDF statements or graphs. As such, the RDF statements or graphs are used to create a decentralized database for product information and reviews.

The embedding module 203 needs to know the nature of the data in these files to be able to embed them into corresponding metadata fields defined in a content description standard/format (e.g., MPEG-7, HT264, HTML5, etc.).

By way example, the embedding module 203 already knows what the dc:title and dc:description predicates are for, it at least embeds the titles and reviews of the four products into corresponding metadata fields for storage as well as later processing (e.g., dissemination) of the media stream. When the embedding module 203 does not understand some predicates, such as dc:rating, it can ignore the predicate without concerning misunderstanding of the rest of the data. As such, the RDF statements or graphs are used to create a decentralized database for product information and reviews. The RDF statements or graphs can be stored for local processing and/or embedded into media stream for external processing.

MPEG-7 is a multimedia content description standard. It was standardized in ISO/IEC 15938 (Multimedia content description interface). Such a multimedia content description is associated with the content itself, to allow fast and efficient searching for material of interest to the user. MPEG-7 is not a standard which deals with the actual encoding of moving pictures and audio, like MPEG-1, MPEG-2 and MPEG-4. MPEG-7 uses XML to store metadata, and optionally attached to timecode to, for example, tag particular events, or synchronized lyrics to a song. Instead of XML, the embedding module 203 embeds the RDF statements/graphs into the metadata fields defined in MPEG-7. MPEG-7 offers a set of metadata elements and their structure and relationships that are defined in the form of Descriptors ("D") and Description Schemes ("DS") to create descriptions, which forms the basis for applications enabling the needed effective and efficient access to multimedia content.

MPEG-7 Multimedia Description Schemes comprises the set of Description Tools dealing with generic to all media as well as multimedia entities. These Description Tools can be grouped into 5 different classes according to their functionality: content description (representation of perceivable information), content management (information about the media features, the creation and the usage of the AV content), content organization (representation the analysis and classifica-

TABLE 1

| Content provider 1 | | |
| --- | --- | --- |
| Content provider1:movieX | dc:title | "X-Man" |
| Content provider1:movieX | retail:price | "$10.75" |
| Content provider1:imageY | dc:title | "Golden Gate Bridge in a sunny day" |
| Content provider1:imageY | retail:price | "$0.49" |
| Content provider 2 | | |
| Content provider2:video1 | dc:title | " Golden Gate Bridge at sunset" |
| Content provider2:video1 | retail:price | "Free" |
| Content provider2:video1 | Content provider2:warranty_code | "None." |
| Content provider2:book2 | dc:title | "Trekking Peru" |
| Content provider2:book2 | retail:price | "$13.21" |
| Content provider2:book2 | Content provider2:warranty_code | "X12" |
| User 1 | | |
| Content provider1:movieX | dc:description | "This movie was great!" . |
| User 2 | | |
| Content provider2:book2 | dc:rating | "Poor map quality." | tion of AV contents), navigation and access (specification of summaries and variations of the AV content), and user interaction (description of user preferences and usage history pertaining to the consumption of the multimedia material). MPEG-7 uses XML for the textual representation of content description, and XML Schema is the base for the DDL that is used for the syntactic definition of MPEG-7 Description Tools.

HTML5 is a language for structuring and presenting content for the World Wide Web, and under development. Its core aims are to improve the language with support for the latest multimedia while keeping it easily readable by humans and consistently understood by computers and devices. HTML5 adds new syntactical features, such as <video>, <audio>, <header> and <canvas> elements, as well as the integration of SVG content. These features are designed to easily include and handle multimedia and graphical content on the web without having to resort to proprietary plugins and APIs. Other new elements, such as <section>, <article>, <header>, and <nav>, are designed to enrich the semantic content of documents.

A RDF database/store stores triples and supports certain querying operations. For example, once extracting RDF triples from a document or a media stream, the reasoning module 205 reasons what is inside a document or a media stream. Since an RDF graph may contain more one RDF statement, a RDF query statement for reasoning can be attached to the RDF graph. This has the effect of filtering the resources that might be returned, or querying based on longer paths through the repository data. For instance, to ask "what is in a movie library that I own", is to filter the results to contain only the movies that I own, by attaching a query graph to the RDF graph of the movie library metadata.

Referring back to the same example, rather than asking just for the list of movies in my movie library, the reasoning module 205 reasons for the pairs of "container" and "when did I watch the movies in my movie library." In one embodiment, following the start of the execution of a computational/functional flow for reasoning (for example, UE 107 instructs to search for and synthesizing media data of the Golden Gate in an information store), the media metadata processing platform 103 is assigned with the task of controlling the distribution of computations related to the computational flow according to resource availability and consumption. The computation distribution may be initiated by the user of UE 107, automatically by UE 107 based on pre-determined settings, by other devices or components associated to UE 107, or a combination thereof. Furthermore, the initiation of computation distribution may trigger the activation of media metadata processing platform 103.

The tracking module 207 tracks where and how the metadata were originally stored (prior to parsing in an RDF format), such as in a RDF store in XML or Notation 3 (N3). N3 is a shorthand non-XML serialization of Resource Description Framework models, designed with human-readability. N3 is much more compact and readable than XML RDF notation.

The tracking module 207 can tell what RDF statements are inside (in an unordered fashion) documents or media streams, whether a particular RDF statement is contained in the RDF store, and provides a set of RDF statements that match a given pattern. The tracking module 207 often cannot tell what order RDF statements appeared in the original document or media stream, what namespace, prefix, and local name were used for any given resource, or what local name was used to identify blank nodes within documents or media streams.

There are pure, low-level RDF stores that maintain a repository of triples and answer questions about the existence of triples in the repository. On the other hand, there are RDF stores that can answer more complicated questions that rely on the semantics of RDFS and OWL, or on other rules of logic provided specially.

The cloud interacting module 209 interacts with the cloud for retrieving or transmitting information, computation load, etc., in order to support the operations of the reasoning module 205 and the tracking module 207. By way of example, the reasoning module 205 intends to search and merge 2D images of the Golden Gate Bridge into a 3D image.

The cloud interacting module 209 determines resource availability information associated with respective levels of a computational environment, wherein the respective levels include, at least in part, a device level 101a-101n, an infrastructure level 117a-117k, and a cloud computation level 111a-111n. The determined resource availability can be performed upon metadata of the resources in the RDF format, thereby deciding at which level each computation for generating the 3D image should be executed. In one embodiment, the cloud interacting module 209 determines resource availability prior to the start of computational flow distribution. In other embodiments, the cloud interacting module 209 periodically (e.g., based on an initial setup) determines resource availability information associated with different levels of the computational environment, store the determined data in storage 215, in information stores 113a-113m of clouds 111a-111n, or a combination thereof, and retrieve/reuse the stored data when needed. In one embodiment, the cloud interacting module 209 stores and distributes the resource availability in the RDF format.

The cloud interacting module 209 further determines resource consumption information associated with respective computational closures, functional blocks, or a combination thereof in the RDF format, which is going to be executed on a computational environment 100. The determined resource consumption may depend on various factors such as computation complexity and the processing power required for the computation, the amount of other resources that the computation consumes (e.g., memory space), etc.

The cloud interacting module 209 processes, analyzes or facilitates processing or analyzing of the resource availability information and the resource consumption information in the RDF format, in order to determine an optimum distribution plan among computational closures, functional blocks, or a combination thereof, in the levels of computational environment by the cloud interacting module 209 to achieve, for example, a workload balance between resources of local and remote computational levels or any other strategic goals set by users, application developers, device manufacturers, service providers, network operators, etc.

It is noted that determining computation distribution strategies may depend on factors other than resources, such as computational capabilities of various components of architectural levels and of the computational closures, functional blocks, or a combination thereof.

The capability analysis module 211 determines one or more capability parameters associated with the computational closures, functional blocks, one or more levels of the computational environment, or a combination thereof in the RDF format. The one or more capability parameters include, at least in part, one or more resource parameters, one or more security parameters, one or more privacy parameters, or a combination thereof. The determined capabilities can be used by the cloud interacting module 209 for deciding which computational closures, functional blocks, or a combination thereof, should be utilized.

In one embodiment, the capability analysis module 211 determines closure/block capabilities following the start of computational flow distribution. In other embodiments, the capability analysis module 211 periodically (e.g., based on an initial setup) determines closure/block capability data associated with different levels of the computational environment, stores the determined data in storage 215, in information stores 113a-113m of clouds 111a-111n, or a combination thereof, and retrieves/reuses the stored data when needed. In one embodiment, the capability analysis module 211 determines and stores the closure/block capabilities in the RDF format.

The cost function module 213 processes and/or facilitates processing of the one or more parameters, such as resource availability, resource consumption and capability information, to determine a cost value for the computational closures, the functional blocks, or a combination thereof. The cost functions may be defined by application developers, device manufacturers, distributed system management, service providers, or a combination thereof in the RDF format. One or more cost functions may be assigned to each architectural level or to every component of each architectural level. Furthermore, definition of a cost function may take into consideration various factors affecting the cost of computations on a certain component or an architectural level such as resource consumption, resource cost, privacy and/or security enforcement measures, processing power/speed, etc. The determined cost can be expressed in the RDF format and utilized by the cloud interacting module 209 for deciding at which level of the computational environment each computational disclosure and each functional block should be executed.

The determination of affordability may include determining whether the available resources at the architectural level are sufficient for the resource consumption level of the computational closures, the functional blocks, or a combination thereof. The determination may also include determining, by the cloud interacting module 209, whether any changes in resource availability information has occurred. In one embodiment, if changes of resource availability have occurred, the cloud interacting module 209 utilizes the change information in the RDF format for processing the resource availability information, resource consumption information, or a combination thereof. Subsequently, if the available resources are sufficient for the cloud interacting module 209 transfers the computational closure, the functional blocks, or a combination thereof, to the computational environment levels with sufficient resources available.

Figure 3:
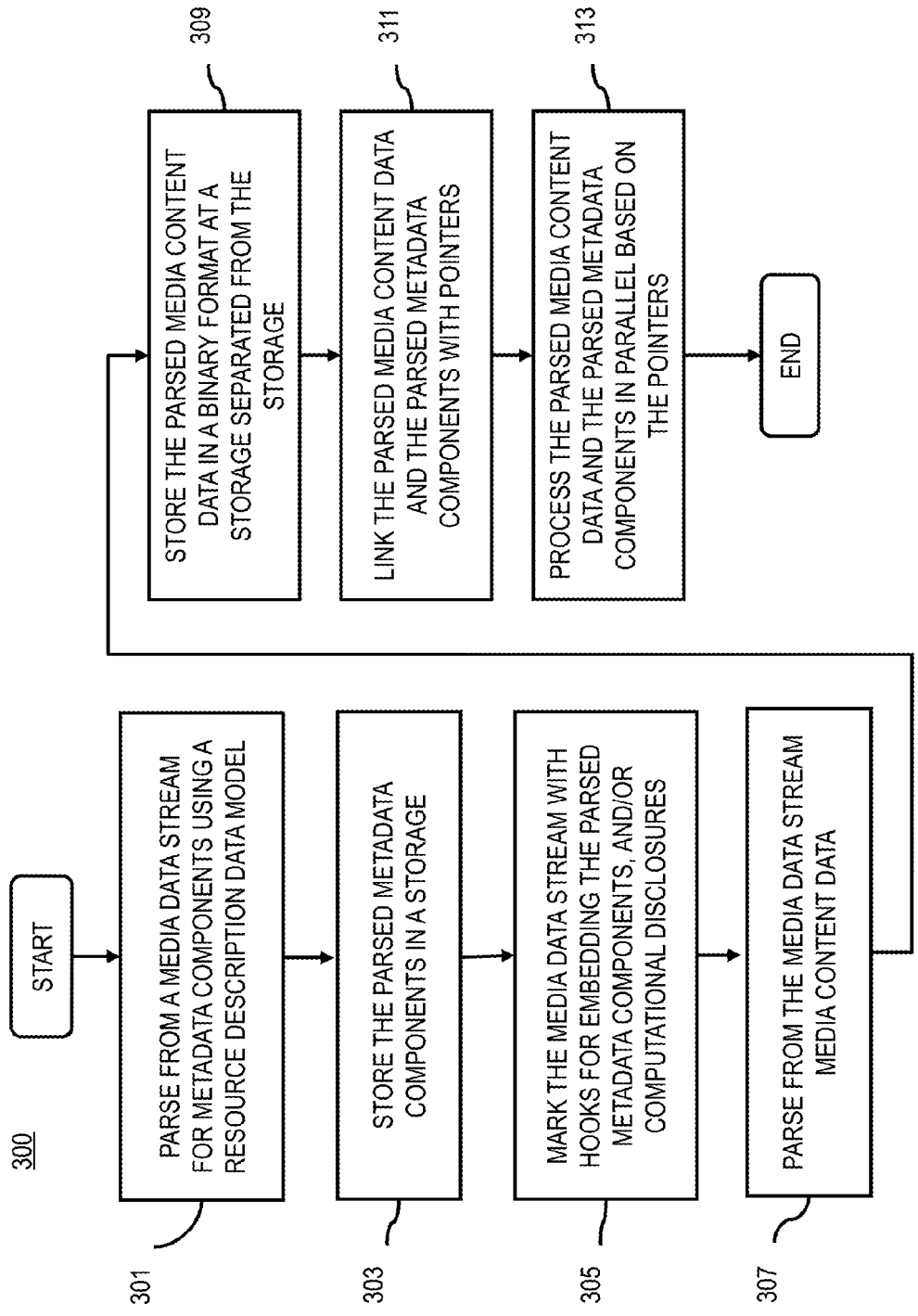
FIG. 3 shows a flowchart of a process for processing metadata in one or more media streams with computation closures, according to one embodiment.
Figure 10:
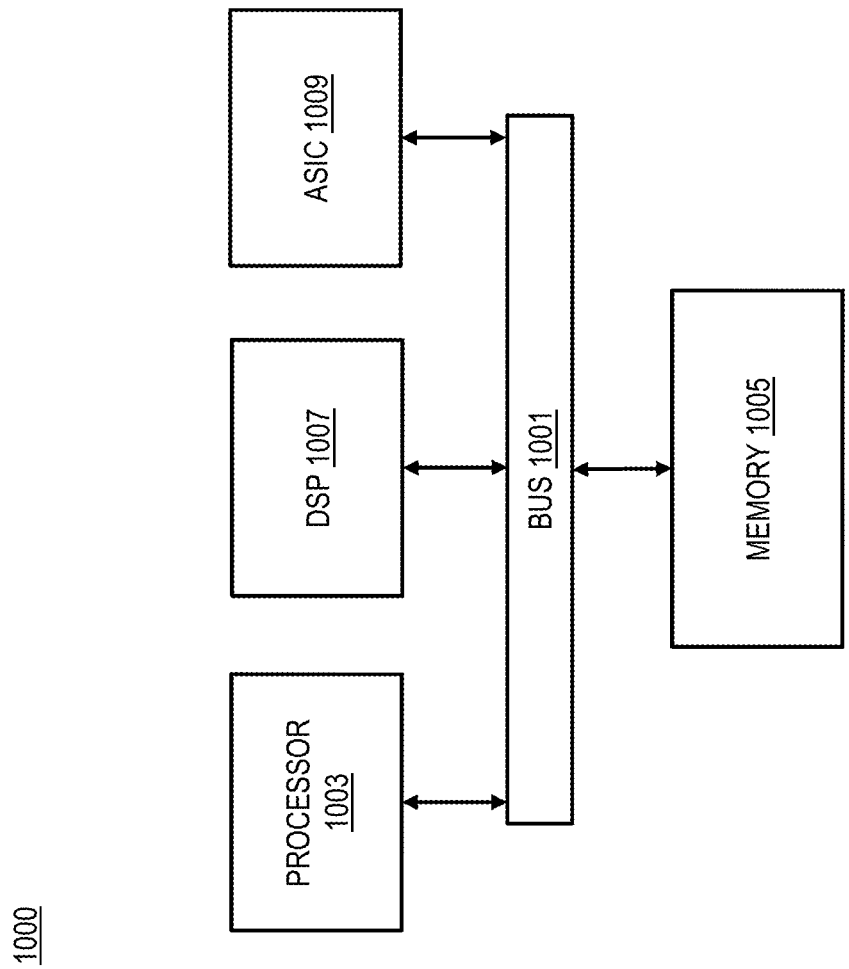
FIG. 10 is a diagram of a chip set that can be used to implement an embodiment of the invention.

FIG. 3 shows a flowchart of a process for processing metadata in one or more media streams with computation closures, according to one embodiment. In one embodiment, the media metadata processing platform 103 performs the process 300 and is implemented in, for instance, a chip set including a processor and a memory as shown in FIG. 10.

In step 301, the media metadata processing platform 103 determine to parse from a media data stream for metadata components using a resource description data model (e.g., an RDF statement or an RDF graph). The media data stream is encoded in MPEG 7, HTML5, H. 264, or a combination thereof. In step 303, the media metadata processing platform 103 causes, at least in part, storing the parsed metadata components.

In step 305, the media metadata processing platform 103 processes and/or facilitates marking the media data stream (e.g., Dave Stewart #1 hit song) with one or more hooks for embedding the parsed metadata components (e.g., author, data source, digital right management, etc.), one or more computational closures (e.g., Block 1: searching all Dave Stewart hit songs, Block 2: selecting #1 among the hit songs, Block 3: playing American Prayer, etc.), or a combination thereof, the one or more computational closures being serialized using the resource description data model.

In one embodiment, the computational flow is represented as an RDF graph consisting of predefined elementary functionalities (e.g., searching, selecting, playing, etc.) interconnected through their parameters (e.g., a searching threshold, a song title, etc.). During execution, the functional blocks at the beginning of the functional flow which are able to execute performs the computations and write the results in a shared knowledge base allowing the block that depends from this result to be notified of the new input and so to start themselves in order to bring on the overall process of calculating the results of the flow.

The media metadata processing platform 103 determines one or more ontologies associated with the metadata components, at least one computational flow, one or more functional blocks, or a combination thereof. Ontology is a common representation of a set of concepts within a domain and the relationships between those concepts. The computation ontology describes different kinds of elementary functionalities that the system 100 supports and different topologies of parameters which could be outputs or inputs of computations. By way of example, the ontologies agree and adopt new vocabularies using Resource Description framework (RDF) and RDFS (RDF schema). The parsed metadata components include parameters in a resource description framework format. The resource description framework format includes parameters of one or more capabilities, a system of record, one or more time stamps, or a combination thereof.

In step 307, the media metadata processing platform 103 determines to parse from the media data stream media content data (e.g., the audio component of American Prayer), for example, in a binary format. In step 309, the media metadata processing platform 103 causes, at least in part, storing the parsed media content data in a format (e.g., binary) different from the resource description data model and at a storage separated from a storage of the parsed metadata components.

In step 311, the media metadata processing platform 103 processes and/or facilitates linking the parsed media content data and the parsed metadata components with one or more pointers. In step 313, the media metadata processing platform 103 processes and/or facilitates a processing of the parsed media content data and the parsed metadata components in parallel based, at least in part, on the one or more pointers, the processing including playback, record, search, editing, data warehousing, or a combination thereof.

The processing includes at least one of: (1) logically reasoning disjoined media streams (e.g., pieces of the song American Prayer), (2) merging contextually relevant media streams, in response to a query (e.g., songs of my favorite pop singers), (3) searching over the media data stream (e.g., a news podcast) by searching within the parsed metadata components (e.g., earthquake in Virginia), (4) analyzing and reasoning content of the media data stream, context of the media data stream, one or more rules (e.g., privacy) for processing the media data stream, or a combination thereof, by processing the parsed metadata components, (5) applying cloud computing, the one or more computational closures, or a combination thereof, on the parsed metadata components, and (6) merging media content data (e.g., 2D images of the Golden Gate Bridge taken from different angles) into multi-dimensional media content data (e.g., a 3D image of the Golden Gate Bridge).

In another embodiment, the media metadata processing platform 103 processes and/or facilitates embedding into the media data stream the parsed metadata components, one or more computational closures, additional metadata associated with one or more target network notes (e.g., user terminals of my colleagues at work), or a combination thereof, at the one or more hooks, the additional metadata authorizing the one or more target network notes to access and process the embedded media data stream (e.g., a patent application draft) based, at least in part, on a resource management policy, security policy, privacy policy, or a combination thereof.

In another embodiment, the media metadata processing platform 103 encodes the embedded media data stream (according to MPEG 7). The media metadata processing platform 103 causes, at least in part, transmission of the embedded media data stream, the encoded media data stream, or a combination thereof, to the one or more target network notes (e.g., friends registered with a social network) via a network.

In another embodiment, the media metadata processing platform 103 causes, at least in part, a serialization of one or more resource description graphs associated with the at least one computational flow, the one or more functional blocks, or a combination thereof. Continuing with the same example, "Dave Stewart" can be encode into "100," "#1 hit song" can be encode into "011," "is" can be encoded into "010" and "American Prayer" can be encoded into "111." As such, "Dave Stewart #1 hit song is American Prayer" is serialized as 100 011 010 111. The serialized RDF graphs are easy to transmit and manipulate in many ways. In various embodiments, the execution, the distribution, or a combination thereof is based, at least in part, on the serialization.

If the system decides to send a functional flow for cloud execution (e.g., live video of a space shuttle for monitoring the travelling route), a remote entity can make decisions about execution strategy by taking in considerations remote resources (e.g., active satellites, on-board camera, etc.). Each programming language can be adapted to the described framework by supporting opportunistic definition and translation into the semantic format of the basic blocks and their connections in the RDF format. The RDF format representing the computational flow is represented in a dataflow and can therefore be executed by optimizing for different domain specific parameters, e.g., parallelism. The code written using the basic functionalities can be general because the platform 103 supports many data type, standard, user defined, vectorial functions, etc.

The one or more computational closures (e.g., atomically tracking a subject by an on board camera in the space shuttle) are relevant, extra, classified, enabled, or a combination thereof for one or more of the target network notes (e.g., computers in the space shuttle launch center) with respect to authorized procession of the embedded media data stream, the encoded media data stream, or a combination thereof. In another embodiment, the media metadata processing platform 103 receives a plurality of the embedded media data stream, the encoded media data stream, or a combination thereof.

The media metadata processing platform 103 processes and/or facilitates a processing of the plurality of the embedded media data stream, the encoded media data stream, or a combination thereof, based, at least in part, on the parsed metadata components in parallel, the processing including playback, record, search, editing, data warehousing, or a combination thereof (e.g., to be available live via NASA channels).

In another embodiment, the media metadata processing platform 103 determines one or more cost functions associated with the at least one computational flow, the one or more blocks, or a combination thereof. Each element of the computational flow may be associated with a cost function or value, which can be used by the system as parameters for optimization.

The one or more cost functions relate, at least in part, to one or more resources (e.g., Blu-ray player, sensed physical values including a temperature, location, etc. of the Blu-ray player or of the environment the Blu-ray player is situated, etc.), one or privacy policies (e.g., consumer credit card numbers only available for authorized merchants), one or more security policies (e.g., digital right management (DRM) compliant, authentication, etc.), or a combination associated with the one or more entities.

By way of example, an entity accesses an information store, an information space, a cloud, or a combination thereof, with basic operations including Insert (to insert information therein), Remove (to remove information therefrom), Update (to update information therein, which is effectively an atomic remove and insert combination), Query (to query for information therein), Subscribe (to set up a persistent query therein such that a change in the query results is communicated to the subscribing entity), etc.

Figure 4A:
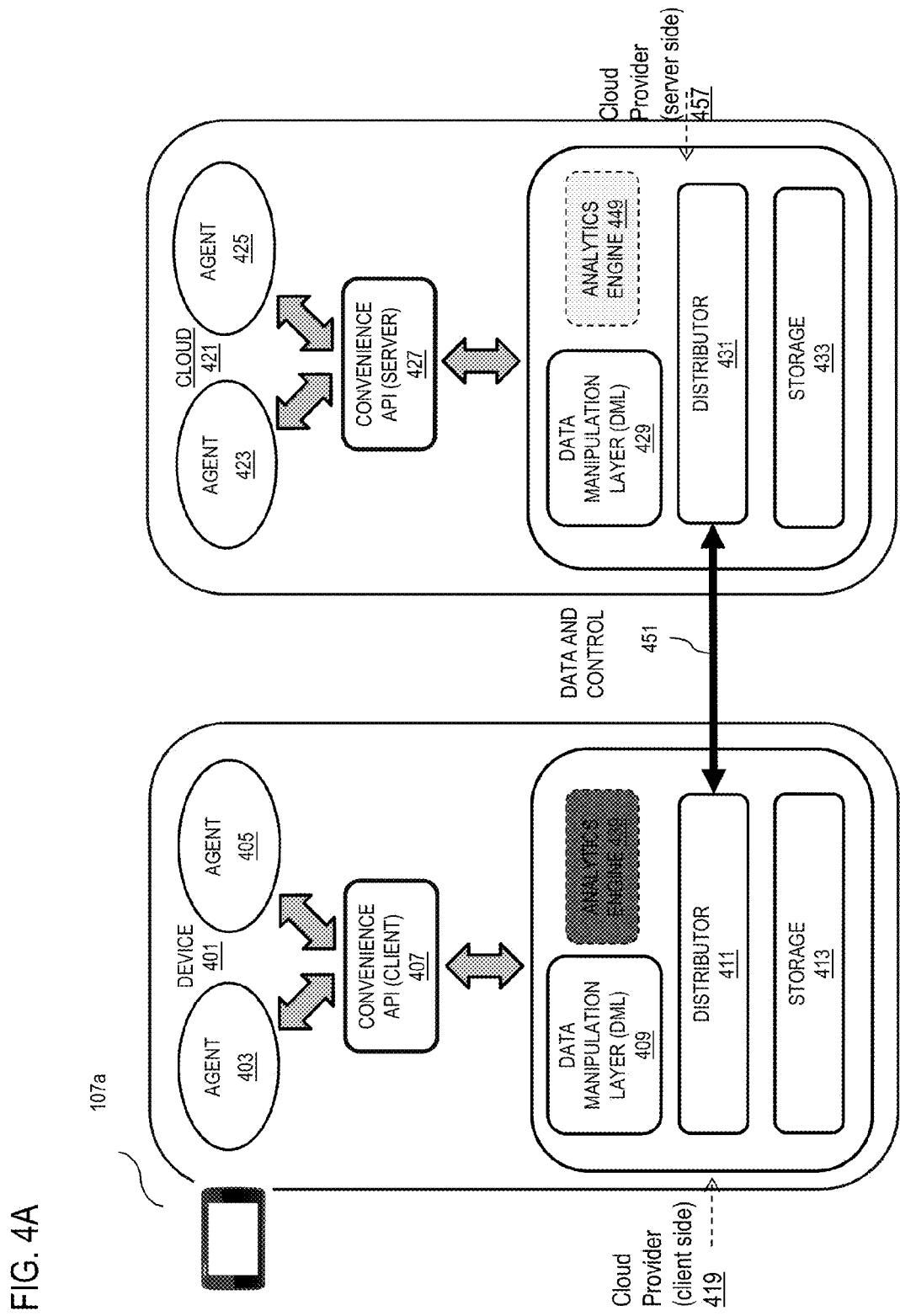
FIGS. 4A-4B are diagrams of the internal structure of a device and the cloud involved in the exchange of structured data, according to one embodiment.
Figure 4B:
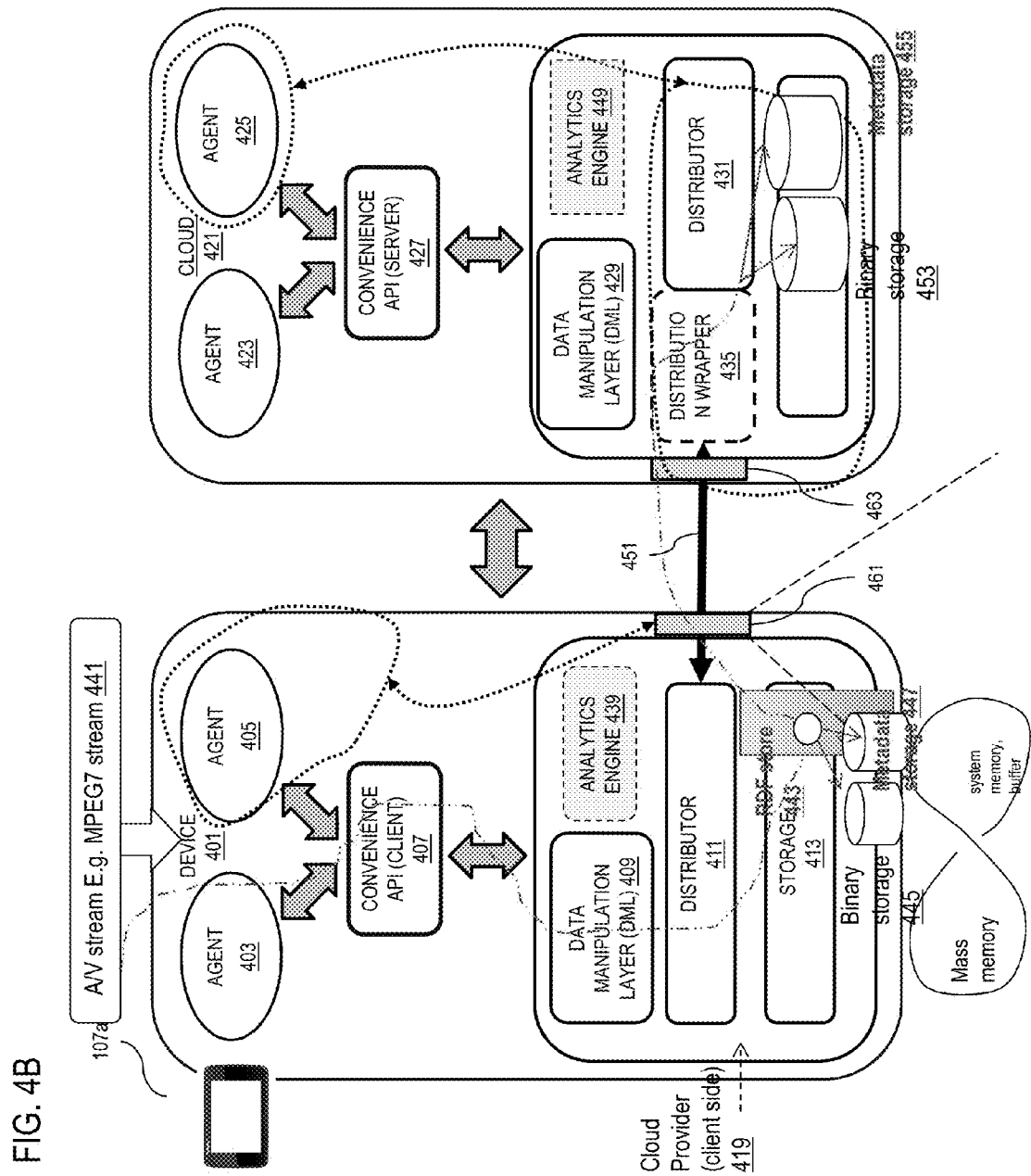

FIGS. 4A-4B are diagrams of the internal structure of a device and the cloud involved in the exchange of data expressed in a serialized data structure (e.g., a RDF data model), according to one embodiment. FIG. 4A shows data and control flow between a device 401 and a cloud 421, according to one embodiment. Each of the device 401 or the cloud 421 may be a user equipment (UE) 107a-107n, a back-end device, a memory tag, a TV set, a Set top box (STB), a PC, a tablet, a PDA, a wearable device, or any other type of device. A device or a cloud may include one or more agents such as agents 403 and 405 in device 401 and agents 423 and 425 in cloud 421. The agents also communicate with interfaces between the device and other devices.

The agents communicate with the cloud via cloud providers 419, 457 that reside in the device 401 and the cloud 421 respectively. Furthermore, the data manipulation layers 409 and 429 control the manipulation (e.g., insert, delete, update, etc.) of the data associated with the device. The data in the RDF format may be locally stored in storage 413 or 433 or distributed in one or more information spaces accessible by the device. By way of example, MPEG7 A/V streams may be created or downloaded, and then passed through to storages 413 or 433. Distributors 411 and 431 handle data exchange between device 401 and cloud 421 shown by arrow 451. Analytics engines 439 and 449 handle metadata in RDF for reasoning and tracking to form a new high level capability. In the exemplary representation of FIG. 4A, device 401 is a UE 107a while cloud 421 may be associated with one or more information stores (e.g., a RDF store).

FIG. 4B shows the framework for data exchange between a device and a cloud, according to one embodiment. In one embodiment, a device may be a UE 107a-107n, which may be a user device, a backend device (e.g., a server), a memory tag (e.g., an RF memory tag) or a combination thereof. Therefore, the exchange of data expressed in the serialized data structure may be between any two UEs such as phone to phone, phone to backend, backend to phone, tag to phone, phone to tag, tag to backend, backend to tag, etc. In some embodiments, the type of tag (e.g., passive vs. active) can be considered. The need for either passive or active tags may, for instance, be derived from computational closure capabilities, requirements, or set at the beginning of transfer. For example, if active tags are required, the computational closure etc. omits the passive tags during the process. FIG. 4B depicts data exchange between a phone 401 and a backend cloud 421.

In one embodiment, the distributor 411 may initiate a request for exchange of data expressed in the serialized data structure with cloud 421. The request may be in the form of a query, a signal, a message or any combination thereof. The request is received and processed at the media metadata processing platform 103 as previously discussed in FIGS. 2 and 3. The block 461 represents a final arbiter for outbound data privacy prior to any data from device 401 is exchanged with any cloud 421. Additionally, in cases where data exchange is originated from cloud 421, component 441 acts as the initial arbiter that receives the inbound data at device 401. Similarly arbiter 443 works as initial and final arbiter for cloud 421.

In one embodiment, A/V stream 441 flows via agent 403 as an RDF point of interaction to parse metadata using the DRF data model. By way of example, the A/V stream is a MPEG7 stream. The MPEG7 codec supports video processing, audio processing and metadata processing. In one embodiment, the cloud 421 includes a client integration portion at the client side offered by in a device provider.

Following the selection of an application mechanism (reasoning, tracking, token, filter, etc.) by the media metadata processing platform 103, the data manipulation layer (DML) 409 applies the mechanism on the data elements that are going to be exchanged, which may be stored in storage 413, or in an RDF store 443. Subsequently, the data is sent to cloud 421 by distributor 411 via final arbiter 461. Rules are available in DML 409 for, e.g., steering the A/V data to the RDF store 443, or two separated binary storage 445 in a binary format and in metadata storage 447 in RDF format.

In another embodiment, the structured data resides on an RF memory tag attached to device 401, a tag server communicates with the memory tag via one of the agents of device 401 (e.g., Agent 403) to extract the data prior to the application of privacy policies to the data.

Subsequently, the exchanged data is received at cloud 421 by initial arbiter 463. The initial arbiter 463 may verify whether the received data meets basic policies (e.g., separated formats for separated storages, privacy, data security, etc.) of cloud 421, and refuse receiving the data if it does not meet the policies. In one embodiment, the exchanged data are stored into binary storage 453 in a binary format and in metadata storage 455 in the RDF format.

In another embodiment, the policy enforcement procedure is performed in communication with the media metadata processing platform 103. If the data is approved, the initial arbiter 463 passes the data on to distributor 431, wherein the distributor 431 facilitates further process of the data. The distributor 431 may be provided with a wrapper 435 to facilitate data distribution and provide additional functionality for the distributor 431.

In one embodiment, the data may be stored on the RF memory tag via a tag writer and agent 425, stored on storage 433, processed by the data manipulation layer 429, etc. Additionally, the data may be stored on an information space associated with cloud 421. For writing the data on cloud 421, the tag writer may communicate with agent 425, the endpoint (e.g., a security filter and/or privacy enabler) 463, storage 433, and, at least partly, with the distributor 431 and distribution wrapper 435 (shown with dotted shapes and arrows on cloud 421).

Figure 5:
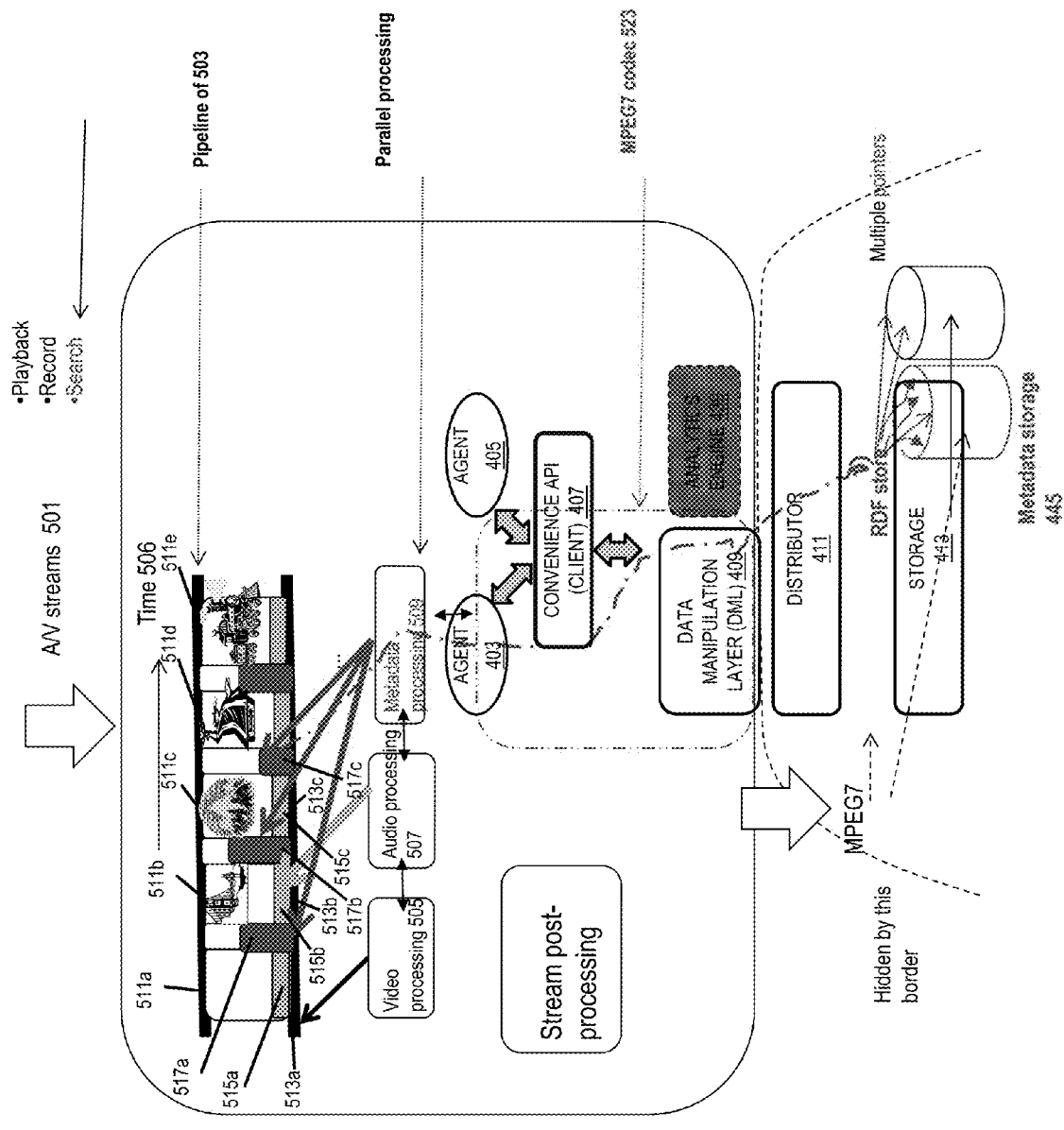
FIG. 5 is a representation of A/V stream parsing and parallel processing, according to one embodiment.

FIG. 5 is a representation of A/V stream parsing and parallel processing, according to one embodiment. A pipeline 503 is created for the A/V stream 501. In one embodiment, different processing, such as video processing 505, audio processing 507, metadata processing 509 of the same media item or of different media items are performed in synchronization and/or in parallel. The pipeline 503 includes a sequence of media items 511*a*, 511*b*, 511*c*, 511*d*, 511*e*, etc. along a timeline 506.

By way of example, the media item 511*b* pertains to the Golden Gate Bridge, the media item 511*c* pertains to the Mount Everest, the media item 511*d* pertains to the Status of Liberty, and the media item 511*e* pertains to a high speed train. Each media item includes a video component 513, an audio component 515, and metadata 517. MPEG-7 requires the metadata be separate from the audiovisual content, thus the metadata is multiplexed with the audiovisual content as shown in the pipeline 503.

The media item 511*b* has a video component 513*b* of the Golden Gate Bridge, an audio component 515*b* of the traffic noise on the golden Gate Bridge, and metadata 517*b* of the Golden Gate Bridge (e.g., time, author/source, weather associated with the captured media item, location, design, material, etc. of the Golden Gate Bridge, etc.). The media item 511*c* has a video component 513*c* of Mount Everest (no audio component), and metadata 517*c* of the mountain (e.g., time, author/source, climate associated with the captured media item, location, elevation, trails, etc. of the Mount Everest, etc.).

The agent 403 applies the MPEG 7 codec 523 to parse from the pipeline 503 the metadata described in XML according to MPEG 7 using the RDF data model, and then embeds the parsed metadata in RDF format into metadata fields of the A/V stream. In one embodiment, the agent 403 marks in A/V stream metadata fields (e.g., the Golden Gate Bridge) for additional serialized information, e.g., relevant, extra, classified and enabled only for certain target endpoints (e.g., UEs of friends and family, etc)

The MPEG 7 codec 523 is capable of encoding and/or decoding a digital data stream or signal according to MPEG 7. In one embodiment, the MPEG codec 523 resides within a main entity in the device 401 (shown in a box of a broken line on device 401 in FIG. 5). In other embodiments, the MPEG codec 523 resides in an external entity, such as in the cloud 421.

In one embodiment, the agent 403 sequentially (e.g., along the timeline 506) parses metadata from a selective group of media items in the pipeline 503. In one embodiment, the agent 403 concurrently parses metadata from a selective group of media items in the pipeline 503. In yet another embodiment, the agent 403 randomly parses metadata from one or more media items in the pipeline 503.

The A/V stream embedded with metadata in RDF format then is sent to the DML 409 and/or the analytics engine 439 to be reasoned or tracked. In one embodiment, the analytics engine 439 forms reasoning over the A/V stream 501 and searches within the metadata for the serialized and embedded information on the Golden Gate Bridge, when the user inputs "take me to the Golden Gate Bridge.' In another embodiment, the analytics engine 439 tracks the source of a media item (e.g., the Golden Gate Bridge) in the A/V stream through the cloud provider's RDF store where streams are separated to binary and metadata parts. For example, when the user wants to know in which A/V streams (or which place) this same metadata is presented, the agent 403 searches metadata for "golden gate bridge" scenes, and then lists or acts upon where such scene exists.

In another embodiment, the A/V stream can be used to track metadata of particular information and make decision based on that locally or direct it to the other side of the communication end point (e.g., transmit, store, execute over connectivity solution). In other embodiments, the A/V stream is tracked to remove adds, add certain extra information (which only certain target end points can track and read), etc. Analytics engine 439 could perform different metadata harvesting and tracking, or perform additional private or public data processing embedded to the A/V stream (or Audio only, or video only, or data only). By way of example, e.g., if X={Nokia advertisement} then keep, else others remove.

Thereafter, the A/V stream embedded with metadata in RDF format is sent to the distributor 411 for the cloud 421. The connection between the device 401 and the cloud 421 may be wired, wireless, WLAN, WAN, RF memory tag system, ULS, etc., and the connection enables metadata in RDF format to available for the analytics engines 439, 449.

Finally, the A/V stream embedded with metadata in RDF format arrives the storage 413 and saved into two separated binary storage 445 (in a binary format) and in metadata storage 447 (in the RDF format). In one embodiment, metadata processing is tuned to transmit a data file (in segments fitting into metadata field) which is then collected at the RDF store 443 for a complete file.

Figure 6:
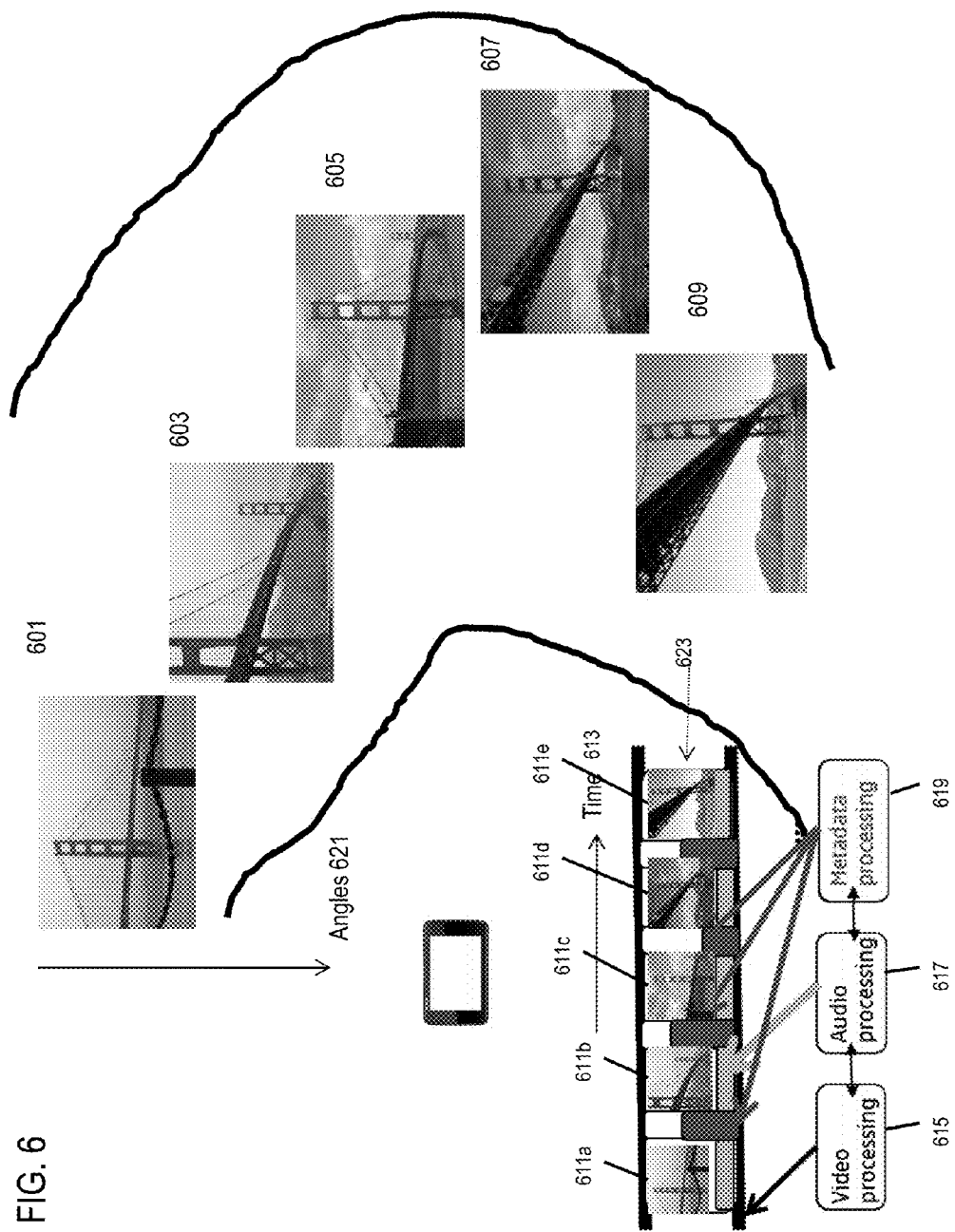
FIG. 6 shows implementation of the process depicted in FIG. 3 to generate a 3D image from 2D images captured from different angles, according to one embodiment.

FIG. 6 shows implementation of the process depicted in FIG. 3 to generate a 3D image from 2D images captured from different angles, according to one embodiment. A video taken for the Golden Gate Bridge can be tagged accordingly. When a user inputs "Take me back to the Golden Gate Bridge," Agent 403 searches over metadata in RDF format of the AV stream, the RDF store 443, the storages 445, or a combination thereof for media items include one or more scenes of the Golden Gate Bridge. By way of example, the user inputs the search scope as "over my video streams/other video streams, include places visited, countries discussed, and videos created"

When a user further inputs "Generate 3D image of the Golden Gate Bridge," Agent 403 searches among the scenes of the Golden Gate Bridge for images 601, 603, 605, 607, 609 of different angles. In one embodiment, the scenes of different angles are directly processed by the analytics engine 439 to generate a 3D image of the Golden Gate Bridge. In another embodiment, the scene of different angles 621 are assembled into a pipeline 623, and then processed by the analytics engine 439 to generate a 3D image of the Golden Gate Bridge. The video processing 615, audio processing 617, metadata processing 619 of the media items are performed in synchronization and/or in parallel.

The analytics engine 439 thus provides metadata harvesting in RDF format, thereby diving into the A/V stream without extra computation. Harvesting is an automated, regular process of collecting metadata descriptions from different sources to create useful aggregations of metadata and related services.

Figure 7A:
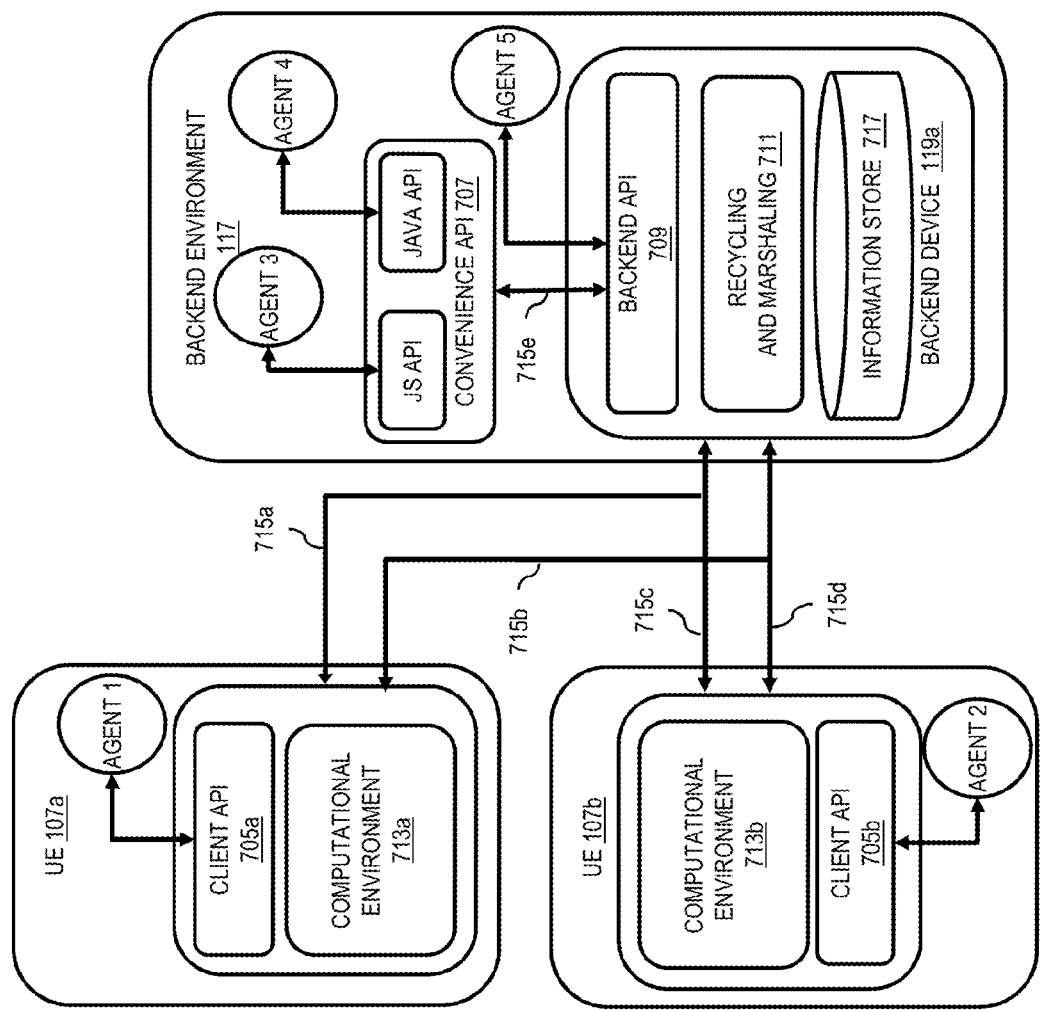

FIGS. 7A-7B are diagrams of computation distribution among devices in order to support tracking and reasoning, according to one embodiment. In one embodiment, in FIG. 7A, the backend environment 117 is a network infrastructure. As discussed, the infrastructure 117 can interact with UE 107a-107i at the IaaS layer, the PaaS layer, or the SaaS layer, to allow UE 107 to remotely manage different services. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 707 that may include APIs tailored to the software development environments used (e.g. JAVA, PHP, etc.). Furthermore, UEs 107a and 107b may include client APIs 705a and 705b. Each API enables interaction between devices and components within another device or a computational environment. For example, backend API 709 enables interaction between the backend device 119a and Agent5, and convenience API 707 enables interaction between the backend device 119a and agents Agent3 and Agent4, wherein each agent is a set of processes that handle computational closures, functional blocks, or a combination thereof, within the backend environment 117. APIs 705a and 705b enable interaction between UE 107a and agent Agent1, and UE 107b and Agent2 respectively. As seen in the example of FIG. 7A, Agent3 works under PHP while Agent4 is a JAVA process. Each of the UEs 107a and 107b has a computational environment 713a and 713b which may be part of a cloud 111. Arrows 715a-715e represent distribution path of computational closures, functional blocks, or a combination thereof, among the environments 713a, 713b and the information store 717. The information store 717 is a repository of computational closures, functional blocks, or a combination thereof, that can be accessed and used by all the UEs and infrastructure components having connectivity to the backend environment 117.

In one embodiment, the backend device 119a may be equipped with a recycling and marshaling component 711 that monitors and manages any access to the information store 717. In other embodiments the recycling and marshaling (i.e., standardization for uniform use) may be a function of the media metadata processing platform 103.

In one embodiment, the computational closures, functional blocks, or a combination thereof, within environments 713a, 713b and the information store 717 may be composed in RDF format and based on anonymous function objects and automatically created by a compiling system using methods for generating anonymous function objects such as lambda expressions.

FIG. 7B is an expanded view of a computational environment 713 as introduced in FIG. 7A. The computational environment 713 may be composed of components for generating one or more computational closures, one or more functional blocks, or a combination thereof. The computational closures, and/or functional blocks can be transformed into the RDF format, to accelerate the processing. In one embodiment the computational environment 713 has a services infrastructure 723 that provides various services for the user of the UE 107. The services may include any media application that can be performed on the UE 107 such as, games, music, text messaging, voice calls, etc. In one embodiment, the services infrastructure 723 provides support for computational distribution under the supervision of the media metadata processing platform 103 as discussed in FIG. 1, FIG. 2, and FIG. 3. The agent Agent1 retrieves the computational closures, the functional blocks, or a combination thereof, as required by the services infrastructure 723 from the information store 749 and stores the newly generated computational closures, functional blocks, or a combination thereof, by the services infrastructure 723 into the information store 749 for distribution purposes per arrow 741.

In another embodiment, the computational environment 713 has a developer experience module 727 that provides various tools for a developer for manipulating services offered by the UE 107. The tools may include standardized and/or abstract data types and services allowing the developers to flow processes together across development platforms. In one embodiment, the developer experience module 727 provides cross platform support for abstract data types and services under the supervision of a media metadata processing platform 103 as discussed in FIG. 1. Agent2 retrieves the computational closures, the functional blocks, or a combination thereof, required by the developer experience module 727 from the information store 749 and stores the newly generated computational closures, functional blocks, or a combination thereof, by the developer experience module 727 into the information store 749 for distribution purposes per arrow 743.

In yet another embodiment, the computational environment 713 has a scalable computing module 731 that provides an abstract wrapper (i.e. Monadic wrapper) for a functional block. This abstraction provides computation compatibility between the functional block and the UE 107. The abstract wrapper may provide scheduling, memory management, system calls and other services for various processes associated with the functional block. These services are provided under the supervision of the media metadata processing platform 103 as discussed in FIG. 1. Agent3 retrieves the computational closures, the functional blocks, or a combination thereof, required by the scalable computing module 731 from the information store 749 and stores the newly generated computational closures, the functional blocks, or a combination thereof, by the scalable computing module 731 into the information store 749 for distribution purposes per arrow 745. In one embodiment, the backend environment 117 may access the information store 749 and exchange/migrate one or more computer closures, the functional blocks, or a combination thereof in a RDF format 747 between the information store 749 and the backend information store 717.

Figure 8:
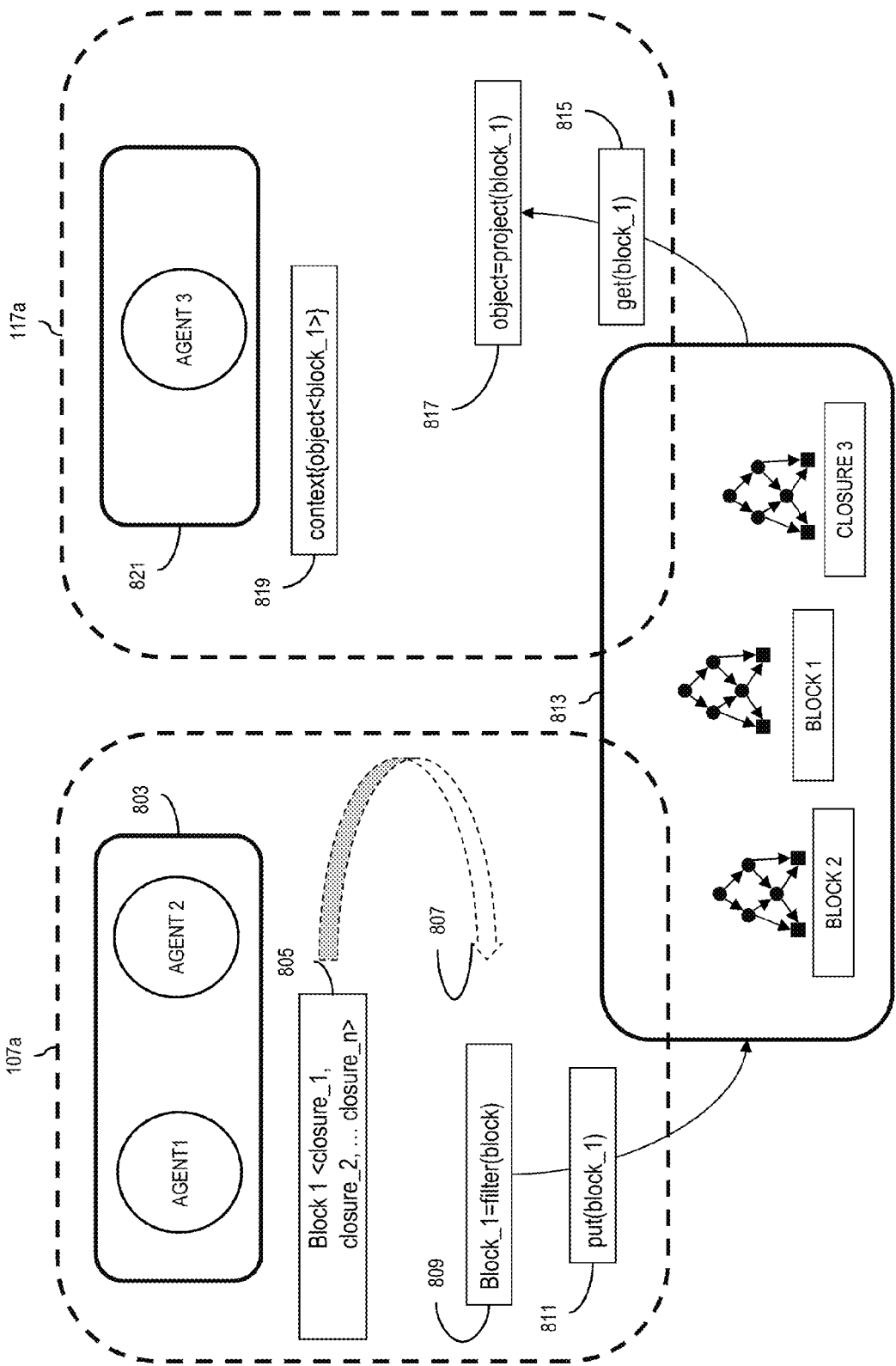
FIG. 8 is a diagram of computational flow distribution from a device to a backend environment, according to one embodiment.

FIG. 8 is a diagram of computational flow distribution from a device to a backend environment, according to one embodiment. In one embodiment, the device 107 is a UE associated with the user. The backend environment 117 may include one or more components, such as backend devices 119 (e.g., router, server, etc.). The UE 107 may include a user context 803 which is being migrated among devices. Agent1 and Agent2 are processors that calculate and handle computational closures, functional blocks, or a combination thereof, within the user context 803. The number of agents may be different in different devices based on their design, functionality, processing power, etc. Block 805 represents a functional blocks including a set of computational closures, closure_1, closure_2, . . . , and closure_n, where each closure is a component of a process, for example, related to a service provided to the user by the user equipment 107. Each closure is a standalone process that can be executed independently from the other closures and expressed in the RDF format. In the example of FIG. 8, the filtering process 807 extracts block_1 from an information space 805 via filtering the set (shown in block 809). The extracted block_1 is added to an information store 813 using the exemplary Put command 811.

It is assumed, in this example, that a component of the backend environment 117 (not shown) is selected by the media metadata processing platform 103 as a destination for computational distribution from UE 107. The extracted functional block, block_1 is migrated to the component by the media metadata processing platform 103, and executed on the component.

In one embodiment, the component receives the functional block block_1 and extracts it from the information store 813 using the Get command 815. The extracted block_1 is projected into a computational environment with the user device context and the object 817 is produced. The block 819 represents the reconstruction of the block into the initial context by a component in charge of the execution. The aggregated context may then be executed in the run-time environment 821 of the component by Agent3.

In another embodiment, the UE 107 and the component may exchange places and the distribution is performed from the component to UE 107. In another embodiment, the component may be a UE. In this embodiment the decomposition and aggregation processes are similar to the above example.

The processes described herein for efficiently processing metadata in one or more media streams may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
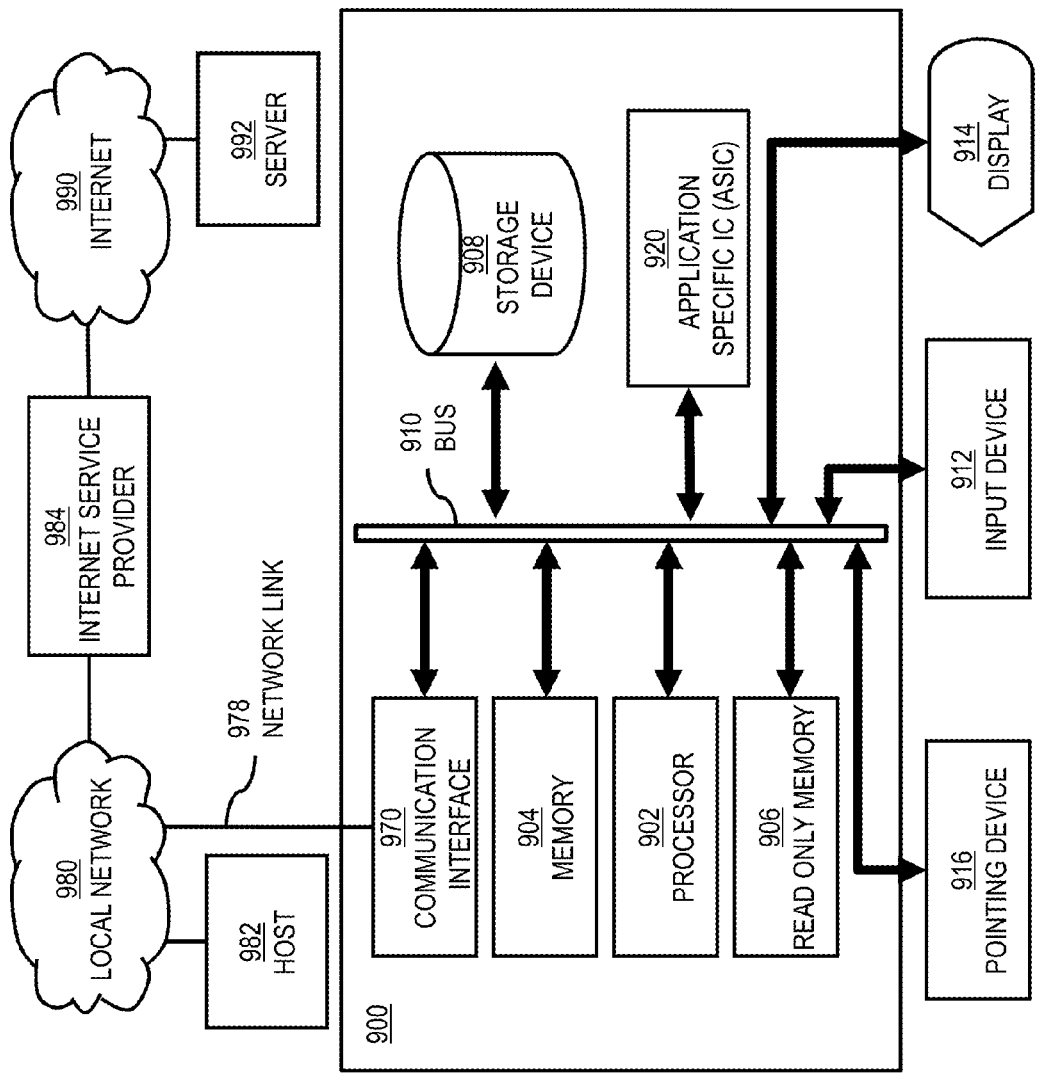
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to efficiently process metadata in one or more media streams as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of efficiently processing metadata in one or more media streams.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to efficiently process metadata in one or more media streams. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for efficiently processing metadata in one or more media streams. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for efficiently processing metadata in one or more media streams, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection from the UE 101 to the cloud for efficiently processing metadata in one or more media streams.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to efficiently process metadata in one or more media streams as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of efficiently processing metadata in one or more media streams.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to efficiently process metadata in one or more media streams. The memory 1005 also stores the data associated with or generated by the execution of the inventive steps.

Figure 11:
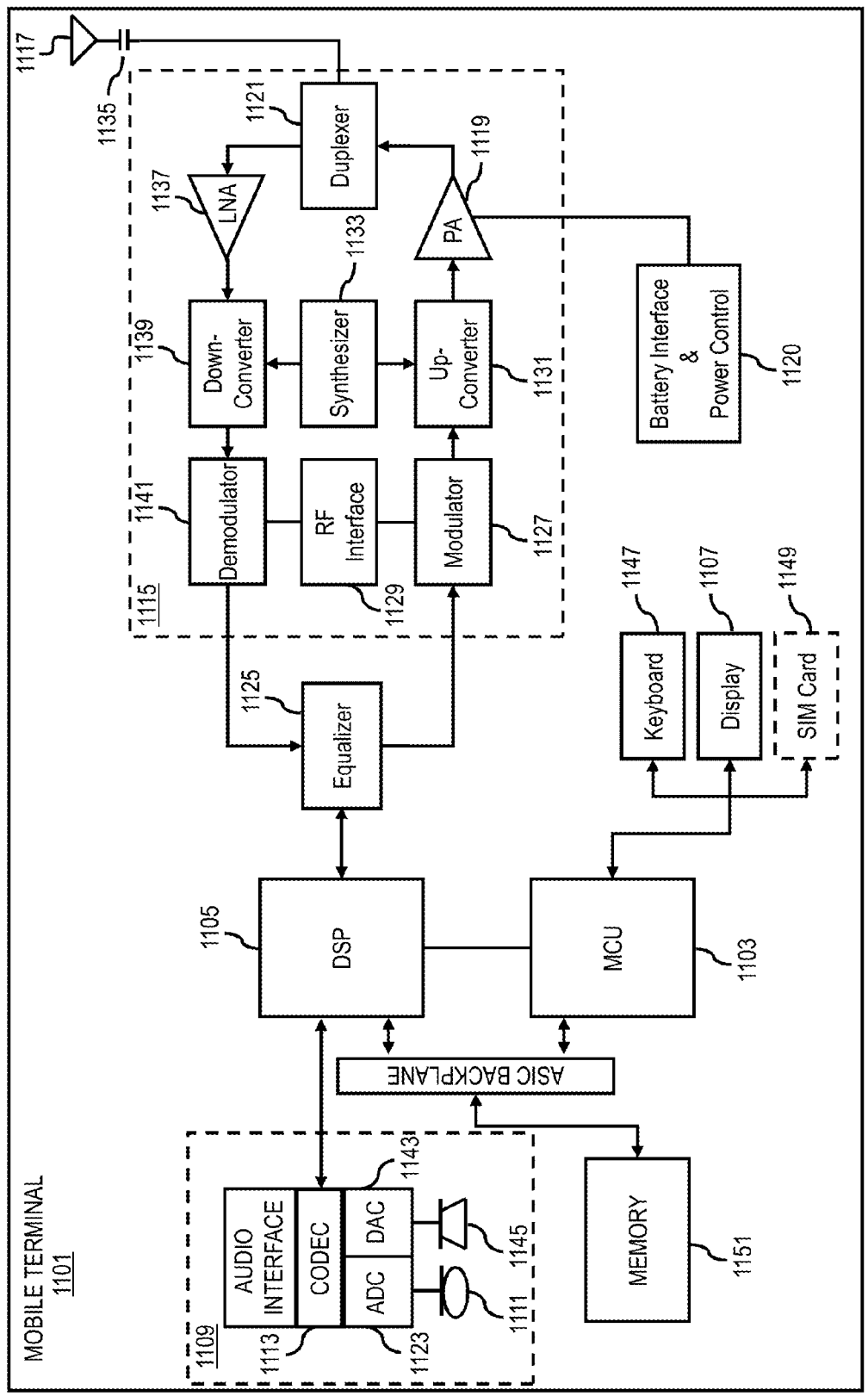
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of efficiently processing metadata in one or more media streams. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of efficiently processing metadata in one or more media streams. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to efficiently process metadata in one or more media streams. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by using a computer processor, to parse metadata components from a media data stream using a resource description model;
   causing, at least in part, a storing of the parsed metadata components, wherein the parsed metadata components include parameters in a resource description framework format in which the resource description framework format does not require a common naming scheme without using one particular vocabulary and includes one or more resource description framework statements, wherein the resource description framework statements consist of subject, predicate, object capabilities, system of record master data source data, and a time stamp, wherein every predicate is not required to be understood to complete the one or more resource description framework statements; and
   determining to mark the media data stream with one or more hooks, configured to embed the parsed metadata components, and at least one computational closure, wherein the computational closure identifies a computation procedure being serialized using the resource description model.

2. A method of claim 1,
   wherein the computational closure identifies at least one relation or communication among a plurality of processes associated with the media data stream,
   wherein the communication is characterized by passing at least one argument, a sharing of process results, selecting results provided from a computation of alternative inputs, a flow of data and a process result or a combination thereof, and
   wherein the computational closure is characterized by slicing of a computation for a process and transmitting the sliced computation.

3. A method of claim 1, wherein the media data stream is encoded in MPEG 7, HTML5, H.264, VP8, WebM, WebP, or a combination thereof.

4. A method of claim 1, further comprising:
   determining to parse media content data from the media data stream; and
   causing, at least in part, a storing of the parsed media content data in a different format and at a storage separated from a storage of the parsed metadata components, wherein the different format is binary; and a linking of the parsed media content data and the parsed metadata components with one or more pointers.

5. A method of claim 1, wherein the computational closure includes a granular reflective set of instructions.

6. A method of claim 4, further comprising:
   processing the parsed media content data and the parsed metadata components in parallel based, at least in part, on the one or more pointers, the processing including playback, record, search, editing, data warehousing, or a combination thereof.

7. A method of claim 1, further comprising:
   determining to embed into the media data stream the parsed metadata components, one or more computational closures, additional metadata associated with one or more target network nodes, or a combination thereof, at the one or more hooks, the additional metadata authorizing the one or more target network nodes to access and process the embedded media data stream based, at least in part, on a resource management policy, security policy, privacy policy, or a combination thereof;
   an encoding of the embedded media data stream; and
   causing, at least in part, a transmission of the embedded media data stream, the encoded media data stream, or a combination thereof, to the one or more target network nodes via a network.

8. A method of claim 7, wherein the one or more computational closures are relevant, extra, classified, enabled, or a combination thereof for one or more of the target network nodes with respect to authorized procession of the embedded media data stream, the encoded media data stream, or a combination thereof.

9. A method of claim 7, further comprising:
   receiving a plurality of the embedded media data stream, the encoded media data stream, or a combination thereof;
   processing the plurality of the embedded media data stream, the encoded media data stream, or a combination thereof, based, at least in part, on the parsed metadata components in parallel, the processing including playback, record, search, editing, data warehousing, or a combination thereof.

10. A method of claim 1, wherein the processing includes at least one of:
   logically reasoning disjoined media streams,
   merging contextually relevant media streams, in response to a query, searching over the media data stream by searching within the parsed metadata components,
   analyzing and reasoning content of the media data stream, context of the media data stream, one or more rules for processing the media data stream, or a combination thereof, by processing the parsed metadata components,
   applying cloud computing, the one or more computational closures, or a combination thereof, on the parsed metadata components, and merging media content data into multi-dimensional media content data.

11. An apparatus comprising:
at least one processor; and
at least one memory including computer program code for one or more programs,
the at least one memory and the computer program code configured to, with the at least one processor, cause the apparatus to perform at least the following,
determine, by using a computer processor, to parse metadata components from a media data stream using a resource description model;
cause, at least in part, a storing of the parsed metadata components, wherein the parsed metadata components include parameters in a resource description framework format in which the resource description framework format does not require a common naming scheme without using one particular vocabulary and includes one or more resource description framework statements, wherein the resource description framework statements consist of subject, predicate, object capabilities, system of record master data source data, and a time stamp, wherein every predicate is not required to be understood to complete the one or more resource description framework statements; and
determine to mark the media data stream with one or more hooks, configured to embed the parsed metadata components, and at least one computational closure,
wherein the computational closure identifies a computation procedure being serialized using the resource description model.

12. An apparatus of claim 11,
wherein the computational closure identifies at least one relation or communication among a plurality of processes associated with the media data stream,
wherein the communication is characterized as at least one of a passing argument, a sharing of process results, selecting results provided from a computation of alternative inputs, a flow of data and a process result or a combination thereof, and
wherein the computational closure is characterized by facilitating a slicing of a computation for a process and transmitting the sliced computation.

13. An apparatus of claim 11, wherein the media data stream is encoded in MPEG 7, HTML5, H.264, VP8, WebM, WebP, or a combination thereof.

14. An apparatus of claim 11, wherein the apparatus is further caused to:
determine to parse media content data from the media data stream;
cause, at least in part, a storing of the parsed media content data in a different format and at a storage separated from a storage of the parsed metadata components, wherein the different format is binary; and
cause, at least in part, a linking of the parsed media content data and the parsed metadata components with one or more pointers.

15. An apparatus of claim 11, wherein the computational closure includes a granular reflective set of instructions.

16. An apparatus of claim 14, wherein the apparatus is further caused to:
process the parsed media content data and the parsed metadata components in parallel based, at least in part, on the one or more pointers, the processing including playback, record, search, editing, data warehousing, or a combination thereof.

17. An apparatus of claim 11, wherein the apparatus is further caused to:
determine to embed into the media data stream the parsed metadata components, one or more computational closures, additional metadata associated with one or more target network nodes, or a combination thereof, at the one or more hooks, the additional metadata authorizing the one or more target network notes to access and process the embedded media data stream based, at least in part, on a resource management policy, security policy, privacy policy, or a combination thereof;
cause, at least in part, an encoding of the embedded media data stream; and
cause, at least in part, a transmission of the embedded media data stream, the encoded media data stream, or a combination thereof, to the one or more target network nodes via a network.

18. An apparatus of claim 17, wherein the one or more computational closures are relevant, extra, classified, enabled, or a combination thereof for one or more of the target network nodes with respect to authorized procession of the embedded media data stream, the encoded media data stream, or a combination thereof.

19. An apparatus of claim 17, wherein the apparatus is further caused to:
receive a plurality of the embedded media data stream, the encoded media data stream, or a combination thereof;
process the plurality of the embedded media data stream, the encoded media data stream, or a combination thereof, based, at least in part, on the parsed metadata components in parallel, the processing including playback, record, search, editing, data warehousing, or a combination thereof.

20. An apparatus of claim 11, wherein the processing includes at least one of:
logically reasoning disjoined media streams,
merging contextually relevant media streams,
in response to a query, searching over the media data stream by searching within the parsed metadata components,
analyzing and reasoning content of the media data stream, context of the media data stream, one or more rules for processing the media data stream, or a combination thereof, by processing the parsed metadata components,
applying cloud computing, the one or more computational closures, or a combination thereof, on the parsed metadata components, and
merging media content data into multi-dimensional media content data.

* * * * *